(12) United States Patent
Watase et al.

(10) Patent No.: US 7,980,478 B2
(45) Date of Patent: Jul. 19, 2011

(54) DOCUMENT READING APPARATUS AND IMAGE FORMING APPARATUS HAVING WIRELESS IC TAG READER

(75) Inventors: Shigeru Watase, Hashimoto (JP); Kazunori Soda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/359,004

(22) Filed: Jan. 23, 2009

(65) Prior Publication Data
US 2009/0200370 A1    Aug. 13, 2009

(30) Foreign Application Priority Data

Feb. 13, 2008   (JP) .................................. 2008-031935

(51) Int. Cl.
G06K 19/06     (2006.01)
G06K 19/00     (2006.01)

(52) U.S. Cl. ........................................ 235/492; 235/487
(58) Field of Classification Search .................. 235/375, 235/379, 380, 487, 492
See application file for complete search history.

(56) References Cited

U.S. PATENT DOCUMENTS

| | | | | |
|---|---|---|---|---|
| 4,778,983 A | * | 10/1988 | Ushikubo | 235/381 |
| 5,619,024 A | * | 4/1997 | Kolls | 235/381 |
| 5,742,279 A | | 4/1998 | Yamamoto et al. | |
| 6,527,176 B2 | * | 3/2003 | Baric | 235/381 |
| 6,827,279 B2 | * | 12/2004 | Teraura | 235/492 |
| 6,973,514 B2 | * | 12/2005 | Yamaguchi | 710/72 |
| 7,139,529 B2 | | 11/2006 | Rekimoto et al. | |
| 7,205,988 B2 | | 4/2007 | Nakamura et al. | |
| 2002/0013770 A1 | * | 1/2002 | Higashi et al. | 705/40 |
| 2005/0105116 A1 | * | 5/2005 | Kobashi | 358/1.12 |
| 2006/0029412 A1 | | 2/2006 | Kato et al. | |
| 2006/0151607 A1 | * | 7/2006 | Horikiri et al. | 235/454 |

FOREIGN PATENT DOCUMENTS

| | | |
|---|---|---|
| CN | 1731813 A | 2/2006 |
| JP | 2-195769 A | 8/1990 |
| JP | 7-129749 A | 5/1995 |
| JP | 2002-204239 A | 7/2002 |
| JP | 2004-153327 A | 5/2004 |
| JP | 2005-352768 | 12/2005 |
| JP | 2006-179977 A | 7/2006 |
| JP | 2006-331222 A | 12/2006 |
| JP | 2007-328687 | 12/2007 |
| JP | 2008-140187 A | 6/2008 |
| WO | WO-2008/065968 A1 | 6/2008 |

\* cited by examiner

*Primary Examiner* — Daniel A Hess
*Assistant Examiner* — Matthew Mikels
(74) *Attorney, Agent, or Firm* — Birch, Stewart, Kolasch & Birch, LLP

(57) ABSTRACT

A document reading apparatus includes an integral display portion integrally provided with an area sensor portion and a wireless IC tag reader, and a main CPU for detecting by the area sensor portion reflection light from an object placed on a screen of the integral display portion and detecting by the wireless IC tag reader that a wireless IC tag comes close to the screen. When it is determined that the object is a document based on an area of reflection light from the object, the main CPU switches to a document reading mode for reading the document on the screen by the area sensor portion, and when it is detected that a wireless IC tag comes close to the screen, the main CPU switches to a wireless IC tag reading mode for reading electronic money information of the wireless IC tag by the wireless IC tag reader.

12 Claims, 19 Drawing Sheets

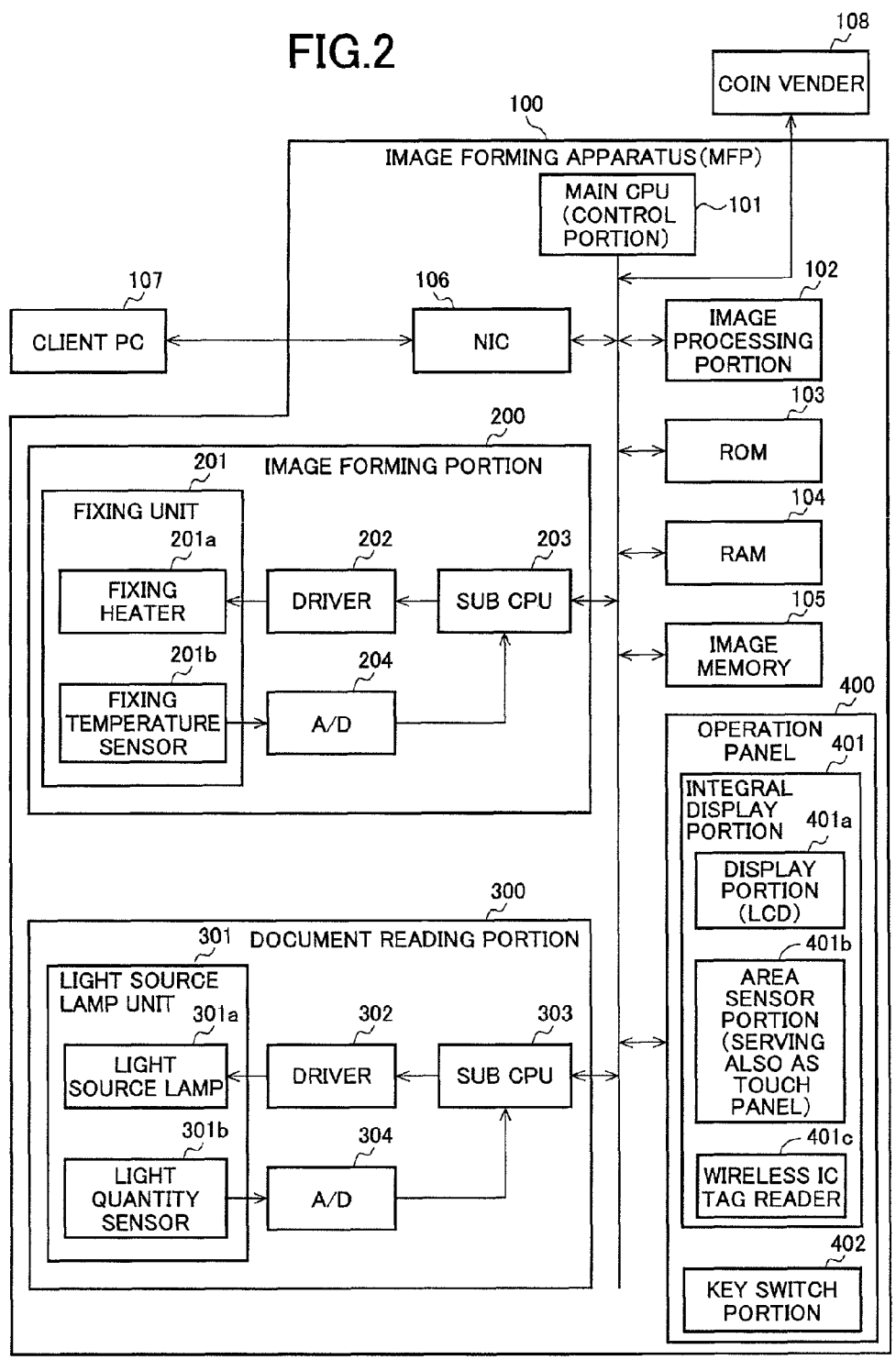

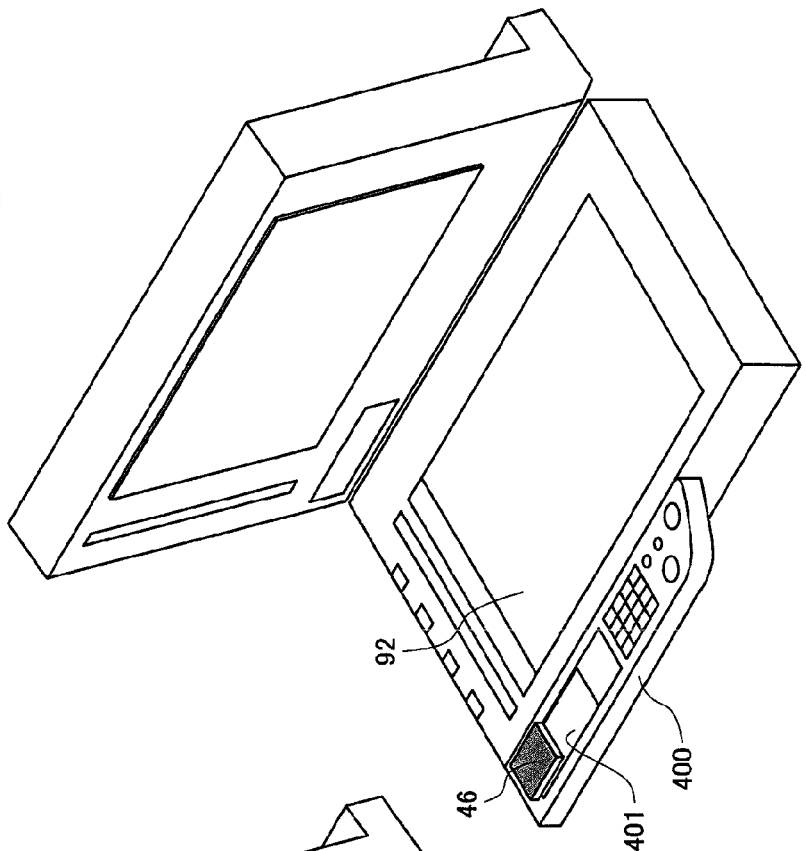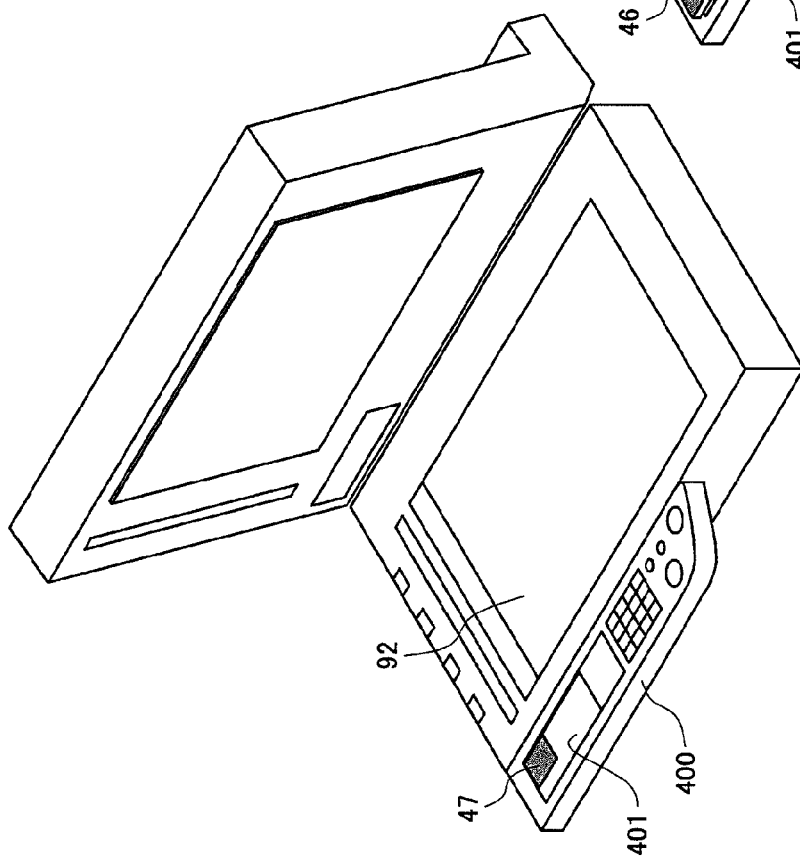

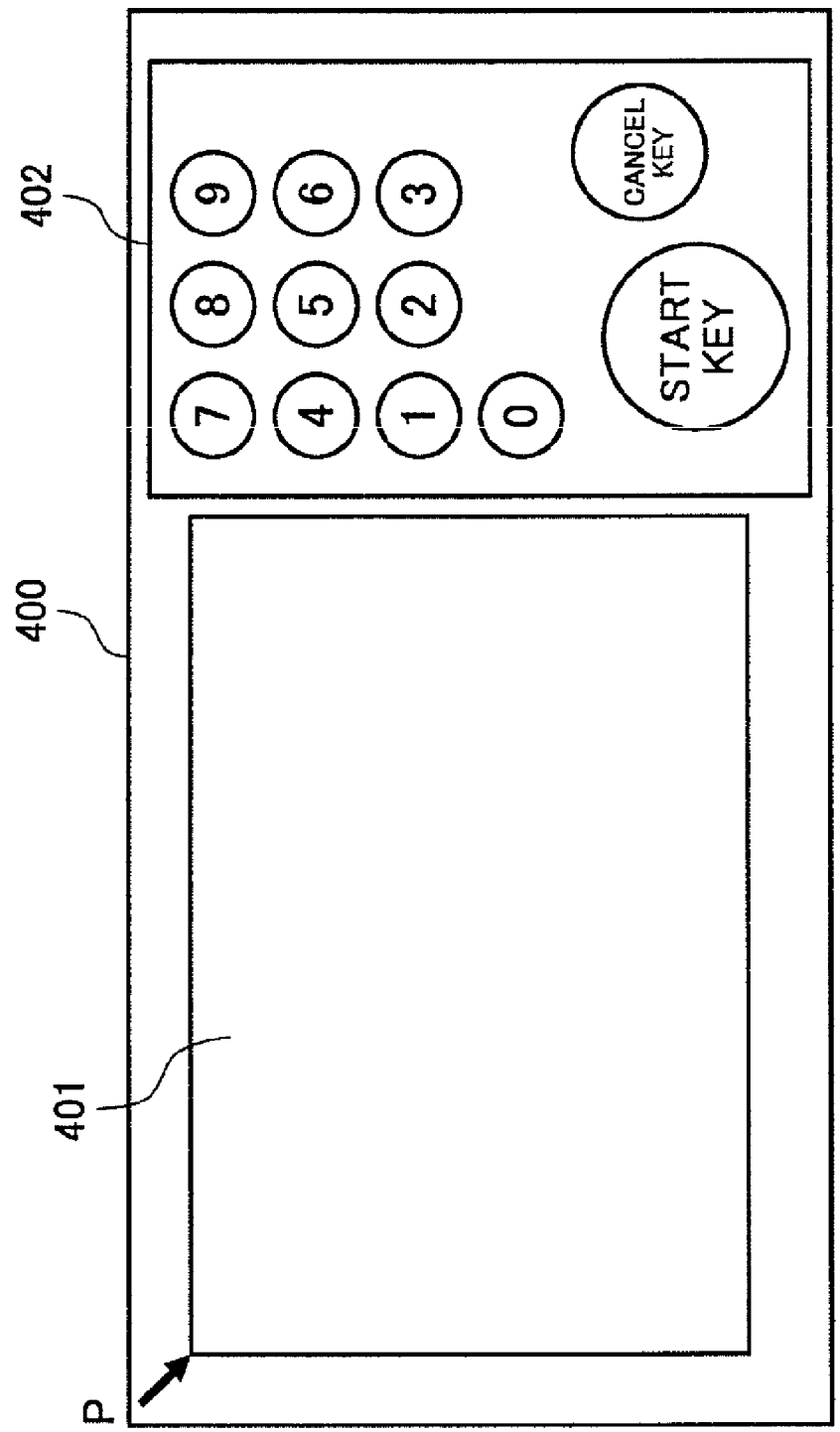

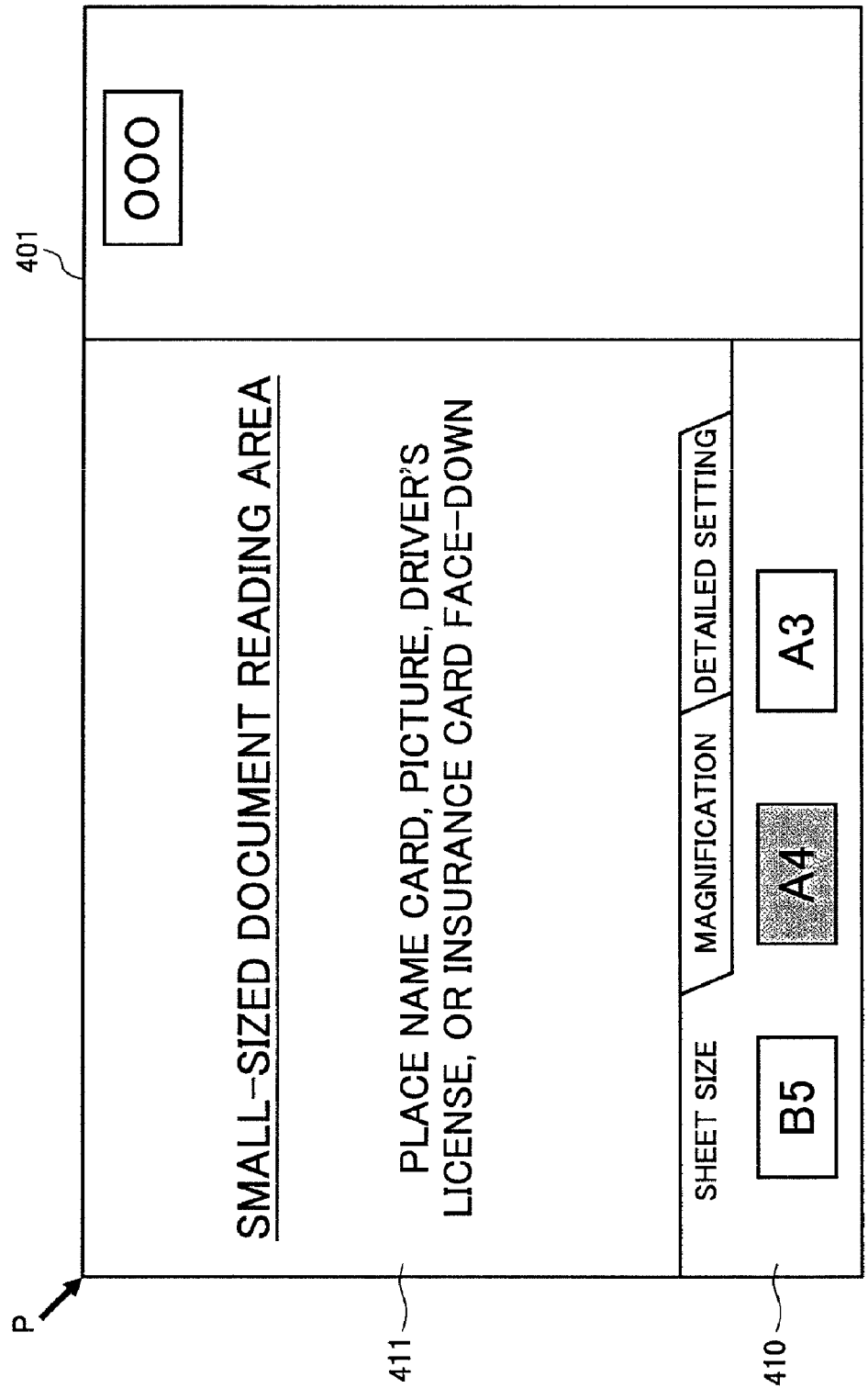

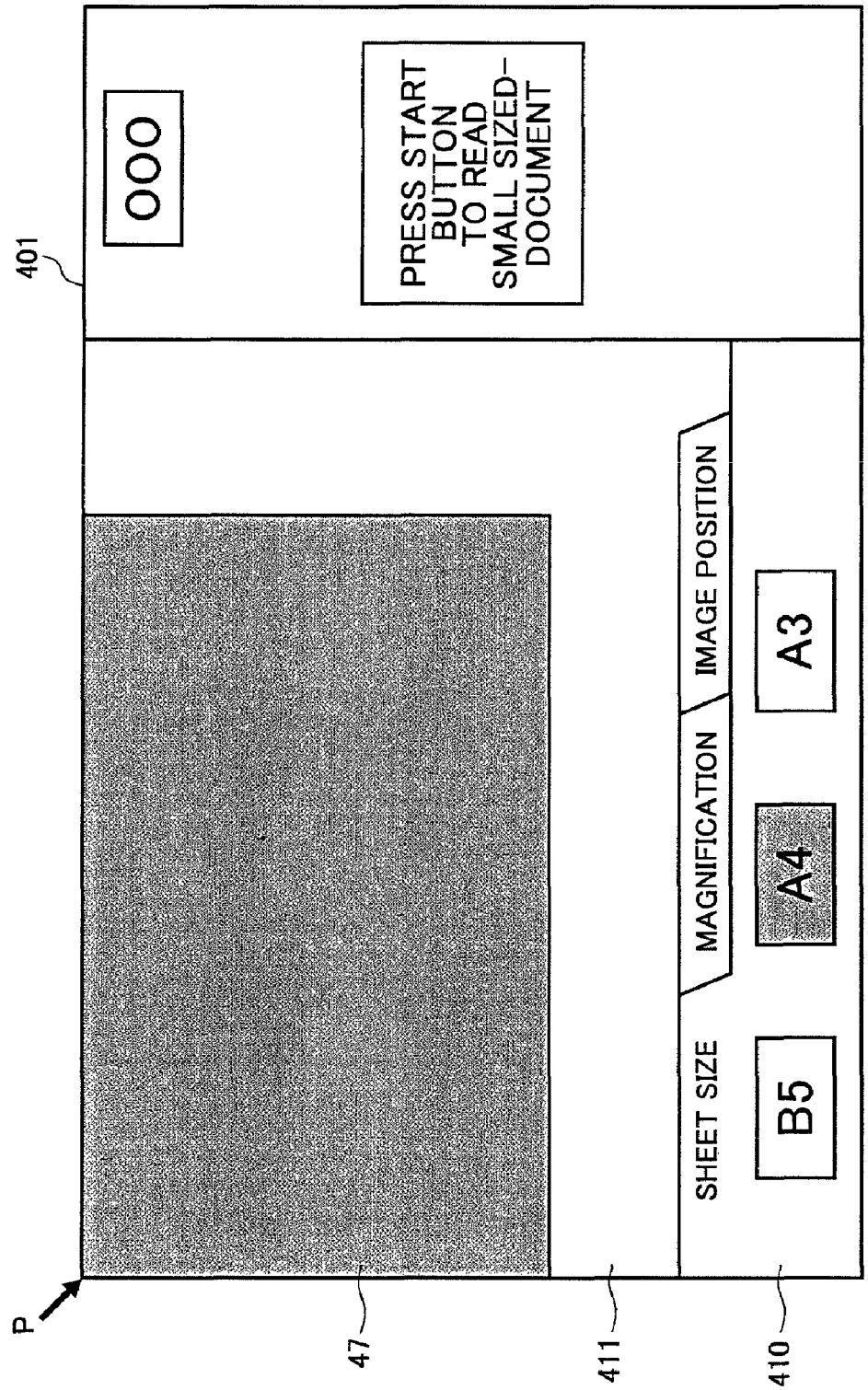

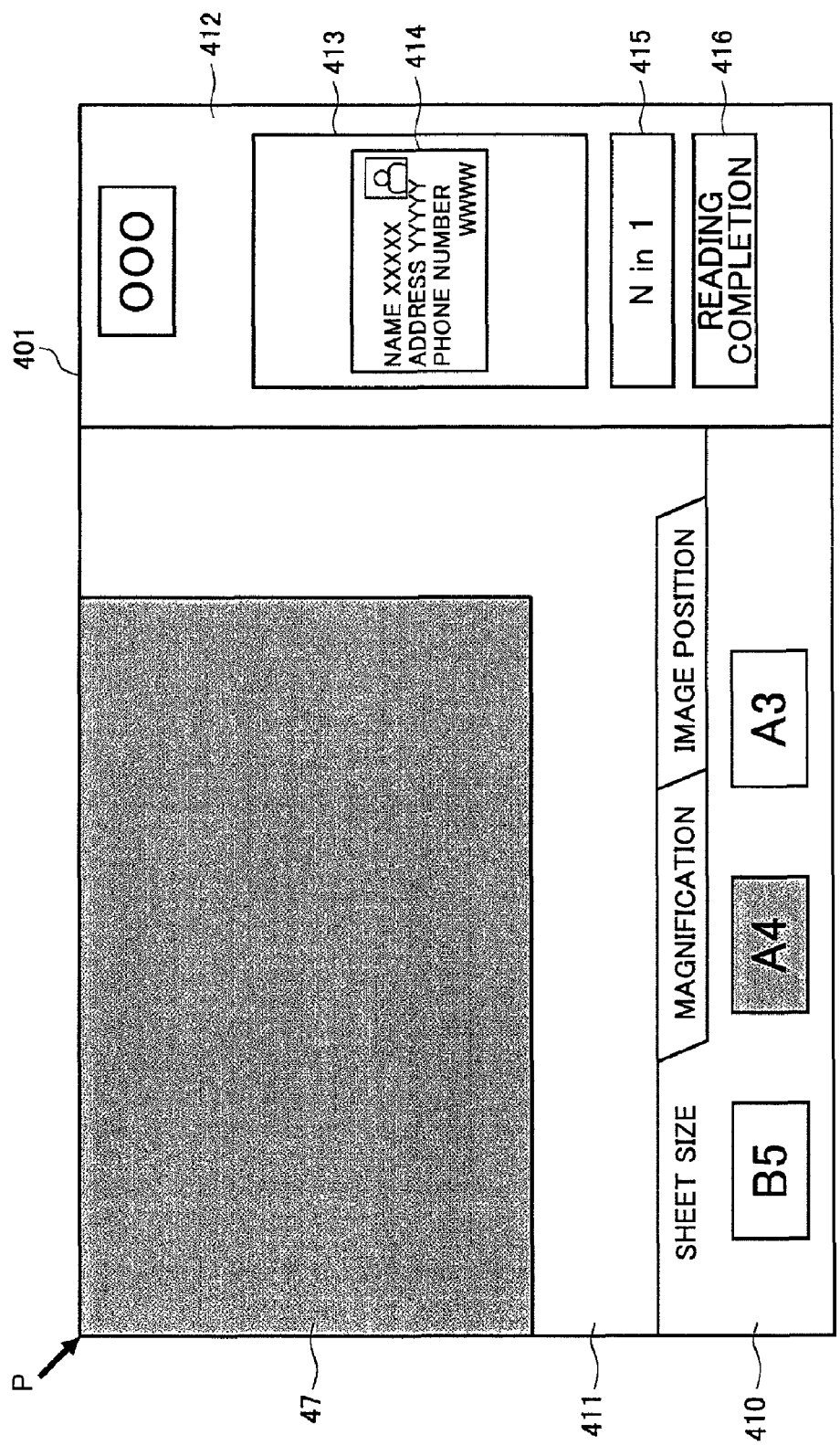

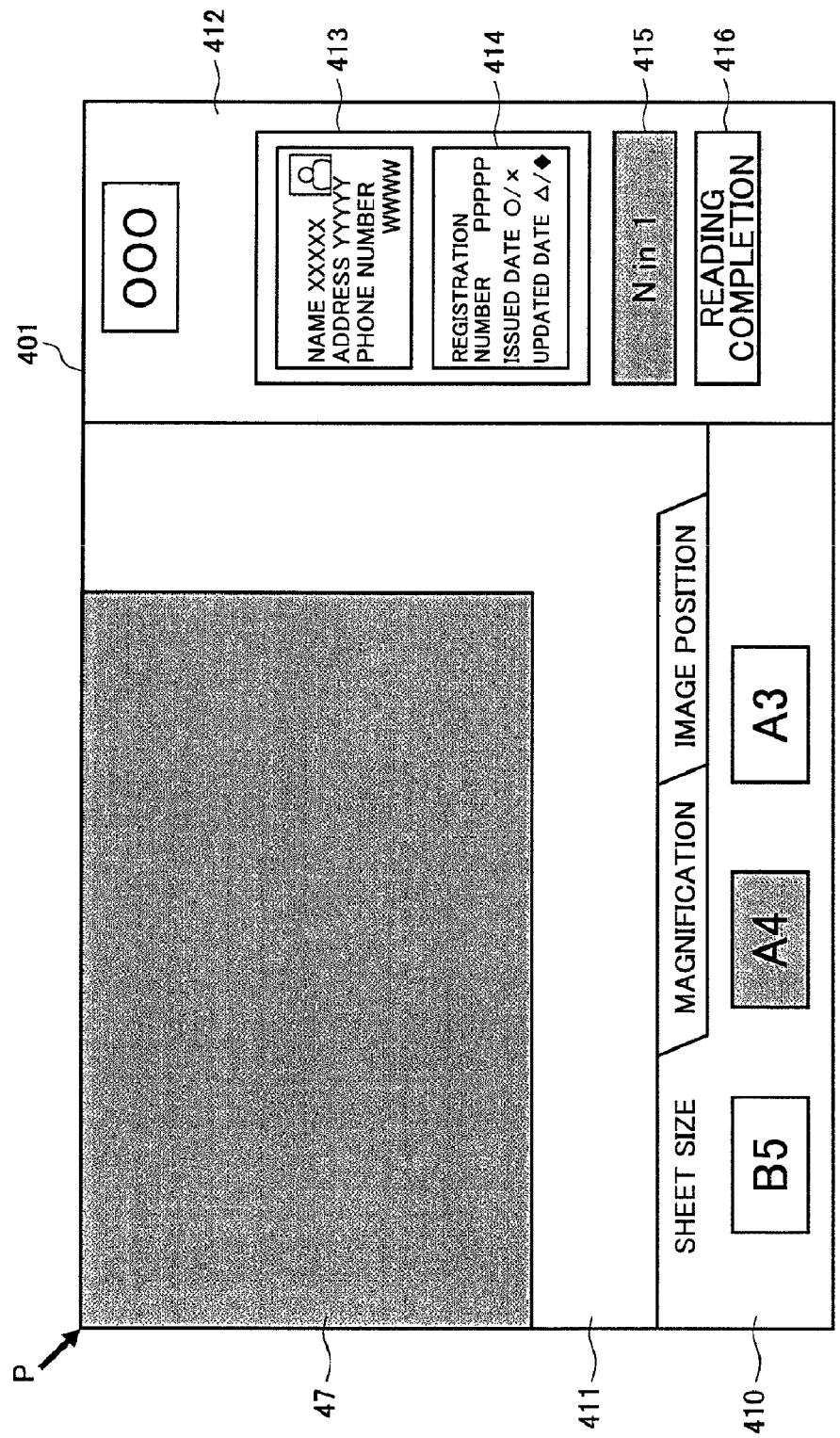

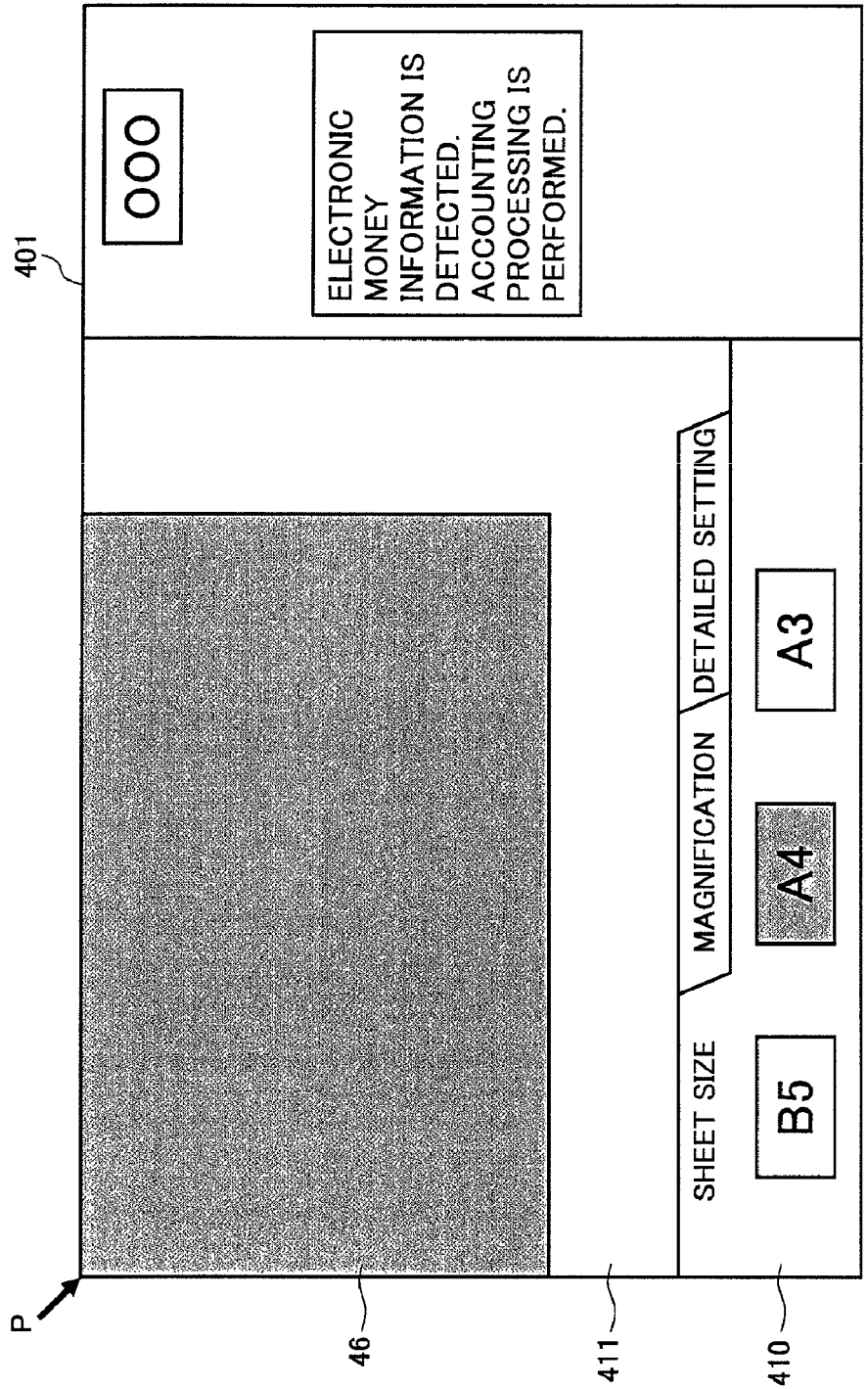

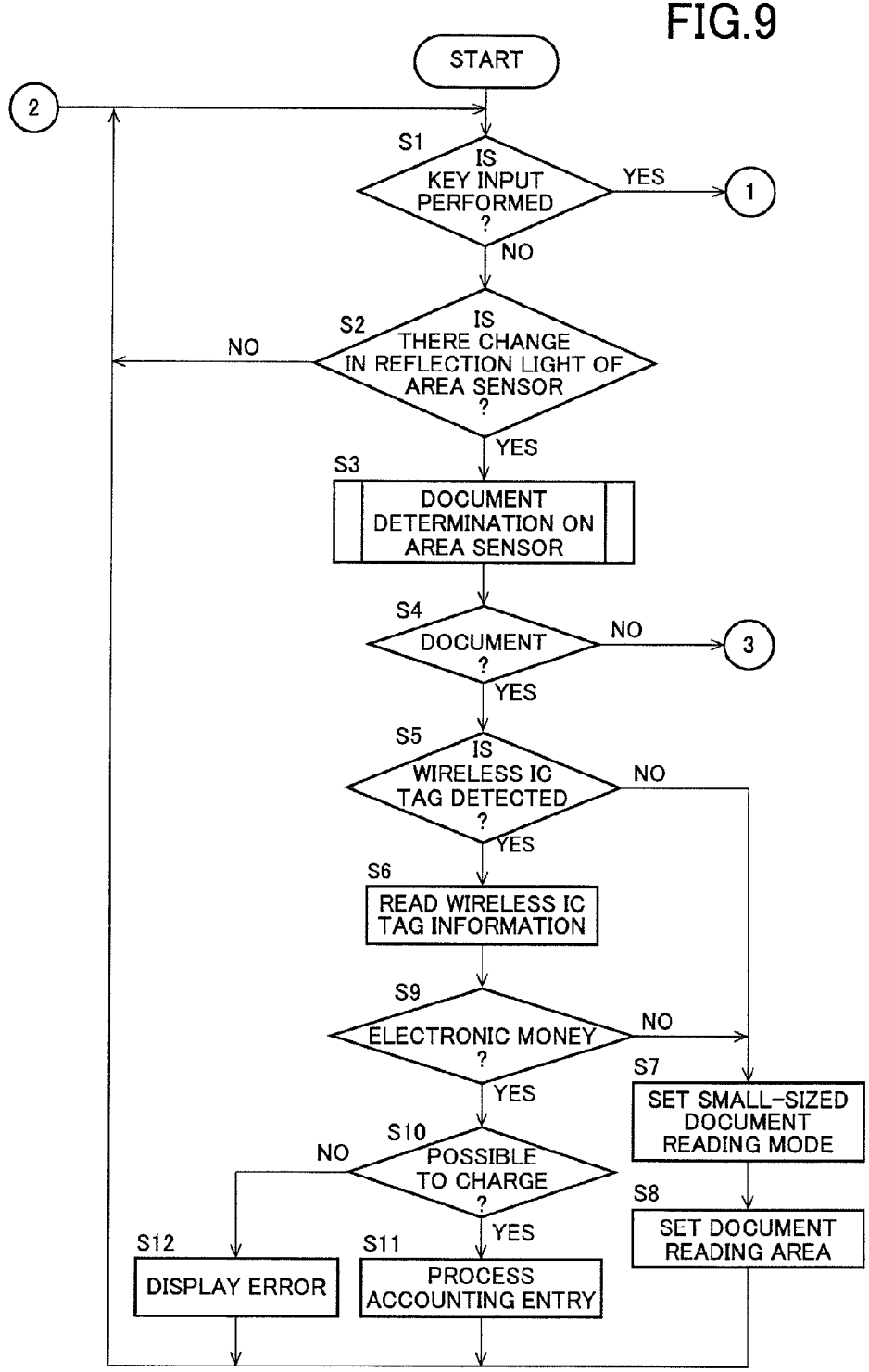

DOCUMENT READING APPARATUS AND IMAGE FORMING APPARATUS HAVING WIRELESS IC TAG READER

CROSS-NOTING PARAGRAPH

This Non-provisional application claims priority under 35 U.S.C. §119(a) on Patent Application No. 2008-031935 filed in JAPAN on Feb. 13, 2008, the entire contents of which are hereby incorporated herein by reference.

FIELD OF THE INVENTION

The present invention relates to a document reading apparatus and an image forming apparatus, and relates to a document reading apparatus having a function for reading a document on a display screen such as a liquid crystal panel, and an image forming apparatus including the document reading apparatus.

BACKGROUND OF THE INVENTION

In recent years, a digital multifunctional peripheral (MFP) having a plurality of functions including a copy function, a printer function, a facsimile function, and a scanner function has become popular. The MFP is provided with a large document platen so that documents comprising sheets of paper up to A3 size can be read normally. When performing copy with this MFP, a user closes a document cover with a document set on the document platen to execute scanning.

At this time, the document cover is closed to hide the document so that the user can not see the document. Thus, the user can leave the document set on the document platen behind carelessly after obtaining a copy. Especially, when copying a relatively small-sized document, such as a driver's license, a name card and an L-sized picture, the document is often left behind without being noticed the existence thereof.

Meanwhile, an input display in which a relatively small-sized liquid crystal panel has a function for reading a document placed on a screen in addition to a conventional display function for displaying image data on the screen attracts public attention (for example, refer to Japanese Laid-Open Patent Publication No. 2006-179977). When a portable terminal such as a PDA is mounted with this input display, a card-sized document can be easily read and captured. Note that, the input display generally employs an area sensor. The area sensor captures an image of an object through a photoelectric conversion element provided on a plane as electric signal and therefore does not need to scan the photoelectric conversion element as it is different from a line sensor and it does not need a motor and the like for scanning.

Further, Japanese Laid-Open Patent Publication No. 2002-204239 describes that a wireless IC tag reader integrally provided with a display portion of a personal computer reads and displays IC tag information. Such a technology of the wireless IC tag is also applied to an MFP, and, for example, a system has been known that a wireless IC tag reader is provided in an MFP to make it possible to pay a copy charge by electronic money using a wireless IC tag.

However, in the conventional technique including the technique described in Japanese Laid-Open Patent Publication No. 2006-179977, since it is not considered to use the input display in combination with the MFP, the document can not be read on a liquid crystal display portion of the MFP.

Furthermore, in a normal operation of the MFP, since various operation keys are displayed on the screen of the liquid crystal display portion, when a document is simply placed on the screen, there is a problem that the various operation keys are hidden by the document to interrupt the operation.

Further, when using an MFP with an IC card or a mobile phone having an electronic money function by a wireless IC tag, just by providing a wireless IC tag reader in a liquid crystal display portion of the MFP and putting the wireless IC tag in which electronic money information is stored close thereto, it is possible to pay a copy charge and the like. In this case, a user is able to perform operation inputting, document reading, and wireless IC tag reading from the liquid crystal display portion of the MFP, thus making it possible to execute a plurality of different functions only with the liquid crystal display portion and improvement of the operability can be expected.

However, in the technique disclosed in the Japanese Laid-Open Patent Publication No. 2006-179977, since it is not considered to use the input display in combination with the MFP, the document can not be read on the liquid crystal display portion of the MFP.

Further, in the technique disclosed in Japanese Laid-Open Patent Publication No. 2002-204239, since it is not considered to use the wireless IC tag reader by incorporating it into the liquid crystal display portion of the MFP, the wireless IC tag can not be read by the liquid crystal display portion of the MFP.

Further, in order to perform reading of a document and reading of a wireless IC tag on the liquid crystal display portion of the MFP, it is necessary to switch the liquid crystal display portion from a document reading mode to a wireless IC tag reading mode, or vice versa, however, the conventional technique can not switch over one mode to the other.

SUMMARY OF THE INVENTION

An object of the present invention is to provide a document reading apparatus that prevents a document from being left behind by performing reading of the document and reading of a wireless IC tag on a display screen of an operation panel, and makes it possible to use an electronic money function using a wireless IC tag by automatically switching over a document reading mode to a wireless IC tag reading mode, or vice versa, and an image forming apparatus comprising the document reading apparatus.

Another object of the present invention is to provide A document reading apparatus, comprising: a display portion integrally provided with an area sensor and a wireless IC tag reader; and a control portion for detecting by the area sensor reflection light from an object placed on a screen of the display portion and detecting by the wireless IC tag reader that a wireless IC tag comes close to the screen, wherein when it is detected that the wireless IC tag comes close to the screen, the control portion switches to a wireless IC tag reading mode for reading information of the wireless IC tag by the wireless IC tag reader.

Another object of the present invention is to provide the document reading apparatus, wherein when it is determined that the object is a document based on an area of reflection light from the object, the control portion is capable of switching to a document reading mode for reading the document placed on the screen by the area sensor, and when it is determined that the object is a document and it is detected that the wireless IC tag comes close to the screen, the control portion prohibits switching to the document reading mode and switches to the wireless IC tag reading mode.

Another object of the present invention is to provide the document reading apparatus, wherein when information of the wireless IC tag is electronic money information, accounting processing is performed based on the electronic money information read by the wireless IC tag reader.

Another object of the present invention is to provide the document reading apparatus, wherein the document reading apparatus is connected to an image forming apparatus and performs accounting processing of a fee for usage of the image forming apparatus by the electronic money information.

Another object of the present invention is to provide the document reading apparatus, wherein the document reading apparatus is connected to an image forming apparatus and a coin-type accounting apparatus and performs accounting processing of a fee for usage of the image forming apparatus by either the coin-type accounting apparatus or the electronic money information.

Another object of the present invention is to provide the document reading apparatus, wherein when the wireless IC tag has a plurality of electronic money information, the control portion selects any of the plurality of electronic money information depending on a position where the wireless IC tag is placed on the screen.

Another object of the present invention is to provide the document reading apparatus, wherein the control portion determines whether or not the object is a finger of a user based on an area of reflection light from the object, and when it is determined as a finger of a user, switching to a user operation mode for receiving a user operation by the area sensor.

Another object of the present invention is to provide the document reading apparatus, wherein the control portion sets, on the screen of the display portion, a reading area for reading a document and an operation area for displaying an operation key of the document reading apparatus.

Another object of the present invention is to provide the document reading apparatus, wherein the display portion has an operation area for displaying an operation key of the document reading apparatus on the screen, and when the object is determined as a document, the control portion sets an area except for an area where the document is placed as the operation area.

Another object of the present invention is to provide the document reading apparatus, wherein the control portion displays, on the operation area of the document reading apparatus, an operation key for confirming whether to switch to a N-up mode for putting a plurality of documents into a single page together.

Another object of the present invention is to provide the document reading apparatus, wherein the control portion displays a preview image of the document on the operation area of the document reading apparatus.

Another object of the present invention is to provide an image forming apparatus comprising the document reading apparatus described above.

BRIEF DESCRIPTION OF THE DRAWINGS

FIG. 2 is a block diagram showing a structural example of the image forming apparatus shown in FIG. 1;

FIGS. 4A and 4B are views showing an overview of a document reading apparatus provided with the integral display portion which is characteristic of the present invention;

FIGS. 5A and 5B are views showing an example of the detailed structure of an operation panel;

FIGS. 6A through 6C are views showing an example of a screen of the integral display portion when a document is read by an area sensor portion;

FIG. 7 is a view showing an example of a screen of the integral display portion when a wireless IC tag card is read by a wireless IC tag reader;

FIG. 9 is a flowchart illustrating an example of processing by a main CPU included in the document reading apparatus of the present invention;

PREFERRED EMBODIMENTS OF THE INVENTION

The preferred embodiments of a document reading apparatus and an image forming apparatus including the document reading apparatus of the present invention will hereinafter be described referring to the accompanying drawings.

Figure 1:
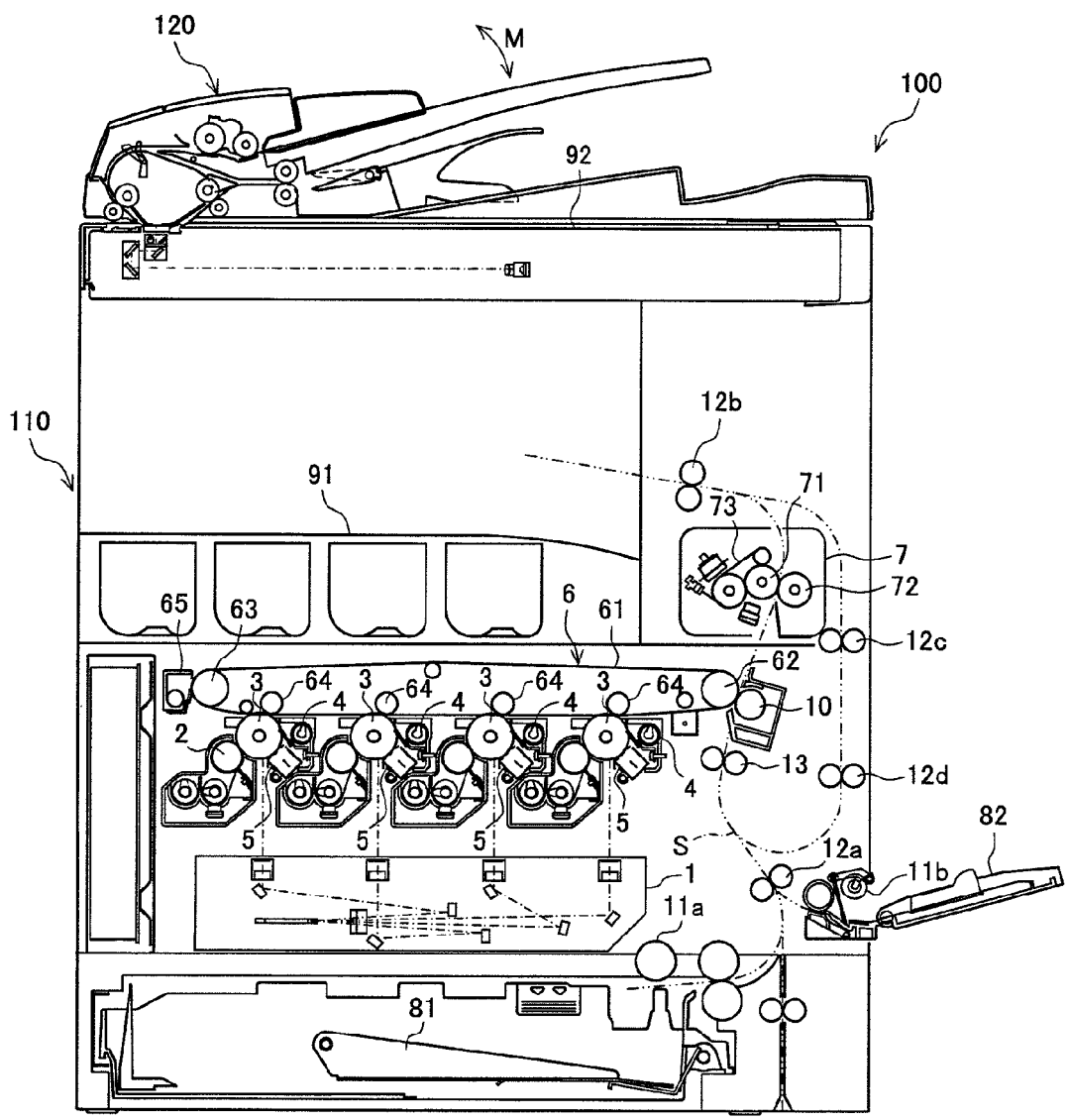
FIG. 1 is a view showing a structural example of an image forming apparatus according to an embodiment of the present invention.

FIG. 1 is a view showing a structural example of an image forming apparatus according to an embodiment of the present invention, where 100 denotes the image forming apparatus. The image forming apparatus 100 forms multicolor and single color images on predetermined sheets (recording paper) in response to image data transmitted from an external portion and is composed of an apparatus main body 110 and an automatic document feeder 120.

The apparatus main body 110 is composed of an exposure unit 1, development devices 2, photoreceptor drums 3, cleaner units 4, charging devices 5, an intermediate transfer belt unit 6, a fixing unit 7, a paper feeding cassette 81, a paper discharge tray 91, and the like.

On the upper part of the apparatus main body 110, a document platen 92 made of transparent glass on which a document is placed is provided, and the automatic document feeder 120 is attached on the upper side of the document platen 92. The automatic document feeder 120 automatically feeds a document on the document platen 92. In addition, the automatic document feeder 120 is constituted so as to be rotatable in the direction indicated by an arrow M and a document can be manually placed on the document platen 92 by opening an upper part of the document platen 92.

Image data handled by the image forming apparatus 100 corresponds to a color image that uses colors of black (K), cyan (C), magenta (M), and yellow (Y). Consequently, four pieces are provided respectively for the development device 2, the photoreceptor drum 3, the charging device 5, and the cleaner unit 4, such that four types of latent images corresponding to respective colors can be formed, and are respectively set for black, cyan, magenta, and yellow, which constitute four image stations.

The charging device 5 is a charging means for charging a surface of the photoreceptor drum 3 uniformly to a predetermined voltage and the contact type such as roller type or brush type charging device may be used, in addition to the charger type as shown in FIG. 1.

The exposure unit 1 is constituted as a laser scanning unit (LSU) including a laser irradiating portion, a reflecting mirror, and the like. The exposure unit 1 is provided with a polygon mirror for scanning laser beam, and optical elements such as lenses and mirrors for guiding laser light reflected by the polygon mirror to the photoreceptor drums 3. The structure of the optical scanning device constituting the exposure unit 1 will be described in detail below. The exposure unit 1 may also use, for example, an EL or LED writing head in which light emitting elements are arranged in an array.

The exposure unit 1 has a function for exposing the charged photoreceptor drums 3 depending on input image data to form electrostatic latent images corresponding to the image data on the surfaces thereof. The development device 2 visualizes the electrostatic latent image formed on each photoreceptor drum 3 with toner of four colors (YMCK). Moreover, the cleaner unit 4 removes and collects toner remained on the surface of the photoreceptor drum 3 after development and image transfer.

The intermediate transfer belt unit 6 disposed above the photoreceptor drums 3 includes an intermediate transfer belt 61, an intermediate transfer belt driving roller 62, an intermediate transfer belt driven roller 63, intermediate transfer rollers 64, and an intermediate transfer belt cleaning unit 65. Four intermediate transfer rollers 64 are provided corresponding to respective colors of YMCK.

The intermediate transfer belt 61 is rotationally driven in a tensioned state by the intermediate transfer belt driving roller 62, the intermediate transfer belt driven roller 63, and the intermediate transfer rollers 64. In addition, each of the intermediate transfer rollers 64 applies a transfer bias for transferring the toner images on the photoreceptor drums 3 onto the intermediate transfer belt 61.

The intermediate transfer belt 61 is arranged so as to come in contact with each of the photoreceptor drums 3, and has a function for forming a color toner image (multicolor toner image) on the intermediate transfer belt 61 by transferring the toner image of each color formed on the photoreceptor drums 3 on top of the other onto the intermediate transfer belt 61 one after another. The intermediate transfer belt 61 is formed as an endless shape, for example, using a film having a thickness of around 100 μm to 150 μm.

Transfer of the toner images from the photoreceptor drums 3 to the intermediate transfer belt 61 is carried out by the intermediate transfer rollers 64 that are in contact with a back side of the intermediate transfer belt 61. A high voltage transfer bias (a high voltage (+) that has a polarity opposite to the charging polarity (−) of the toner) is applied to the intermediate transfer rollers 64 to transfer the toner images. The intermediate transfer rollers 64 are rollers based on metal (for example stainless steel) shafts with a diameter of 8 to 10 mm and the surfaces thereof are covered by an electrically conductive elastic material (for example, EPDM and urethane foam or the like). This electrically conductive elastic material makes it possible to apply a uniform high voltage to the intermediate transfer belt 61. In the present embodiment, the rollers are used as transfer electrodes, but it is also possible to use brushes and the like.

The electrostatic image visualized on each photoreceptor drum 3 depending on each color as described above is piled up on the intermediate transfer belt 61. In this way, with the rotation of the intermediate transfer belt 61, the piled-up image information is transferred onto a sheet by a transfer roller 10, which will be described below, disposed at a contact position between the sheet and the intermediate transfer belt 61.

At this time, the intermediate transfer belt 61 is brought into press-contact with the transfer roller 10 under a predetermined nip and a voltage (a high voltage (+) that has a polarity opposite to the charging polarity (−) of the toner) is applied to the transfer roller 10 to transfer the toner to the sheet. In addition, to obtain the nip constantly by the transfer roller 10, one of the transfer roller 10 and the intermediate transfer belt driving roller 62 is made of a hard material (metal or the like) and the other is made of a soft material such as an elastic roller (elastic rubber roller, resin foam roller or the like).

Furthermore, as described above, since toner that adheres to the intermediate transfer belt 61 due to contact with the photoreceptor drums 3, or toner that is not transferred onto the sheet by the transfer roller 10 and remained on the intermediate transfer belt 61 causes color mixture of the toner at the next process, the toner is removed and collected by the intermediate transfer belt cleaning unit 65. The intermediate transfer belt cleaning unit 65 includes a cleaning blade for example as a cleaning member that touches the intermediate transfer belt 61, and the intermediate transfer belt 61 with which the cleaning blade is contact is supported from its back side by the intermediate transfer belt driven roller 63.

The paper feeding cassette 81 is a tray for storing sheets (recording paper) used for image formation and is provided on the lower side of the exposure unit 1 of the apparatus main body 110. Sheets used for image formation can be also placed on a manual paper feeding cassette 82. In addition, the paper discharge tray 91 provided on the upper side of the apparatus main body 110 is a tray for accumulating printed sheets face-down.

Moreover, the apparatus main body 110 is provided with a paper conveying path S of substantially vertical shape for sending sheets in the paper feeding cassette 81 and the manual paper feeding cassette 82 to the paper discharge tray 91 via the transfer roller 10 and the fixing unit 7. Pickup rollers 11a and 11b, a plurality of conveyance rollers 12a to 12d, a resist roller 13, the transfer roller 10, the fixing unit 7, and the like are disposed in a vicinity of the paper conveying path S from the paper feeding cassette 81 or the manual paper feeding cassette 82 to the paper discharge tray 91.

The conveyance rollers 12a to 12d are small-sized rollers for facilitating/assisting the conveyance of sheets, and a plurality of these rollers are provided along the paper conveying path S. In addition, the pickup roller 11a is provided near an end portion of the paper feeding cassette 81 and picks up sheets one by one from the paper feeding cassette 81 to feed to the paper conveying path S. Similarly, the pickup roller 11b is provided near an end portion of the manual paper feeding cassette 82 and picks up sheets one by one from the manual paper feeding cassette 82 to feed to the paper conveying path S.

The resist roller 13 temporarily holds the sheet conveyed in the paper conveying path S. The resist roller 13 also has a function for conveying the sheet to the transfer roller 10 at a timing when a leading edge of the toner image on the photoreceptor drum 3 meets a leading edge of the sheet.

The fixing unit 7 includes a heat roller 71 and a pressure roller 72, and the heat roller 71 and the pressure roller 72 rotate holding a sheet between them. In addition, the heat roller 71 is set to have a predetermined fixing temperature by a control portion based on signal from a temperature detector (not-shown) and has a function for melting/mixing/pressing the multicolor toner image transferred to the sheet to thermally fix to the sheet by performing thermocompression of toner to the sheet together with the pressure roller 72. Moreover, an external heat belt 73 is provided for externally heating the heat roller 71.

Next, the sheet conveying path will be described in detail. As has been described above, the image forming apparatus 100 is provided with the paper feeding cassette 81 and the manual paper feeding cassette 82 for previously storing sheets. In order to feed sheets from the paper feeding cassettes 81 and 82, the pickup rollers 11$a$ and 11$b$ are disposed so as to guide the sheets to the paper conveying path S one by one.

The sheet conveyed from each of the paper feeding cassettes 81 and 82 is conveyed to the resist roller 13 by the conveyance roller 12$a$ in the paper conveying path S and is conveyed to the transfer roller 10 at a timing of making a leading edge of the sheet meet a leading edge of the image information on the intermediate transfer belt 61, and the image information is then written to the sheet. Thereafter, the sheet passes through the fixing unit 7 so that unfixed toner on the sheet is thermally melted/fixed, and the sheet is discharged on the paper discharge tray 91 through the conveyance roller 12$b$ disposed behind.

The above-mentioned conveying path is for a case where single side printing is requested for the sheet, on the other hand, in a case where duplex printing is requested, when a rear end of the sheet on which the single side printing is completed and has passed through the fixing unit 7 is held by the last conveyance roller 12$b$, the conveyance roller 12$b$ is rotated in the opposite direction to guide the sheet to the conveyance rollers 12$c$ and 12$d$. After the sheet passes through the resist roller 13 and printing is executed on its back side, the sheet is discharged in the paper discharge tray 91.

FIG. 2 is a block diagram showing a structural example of the image forming apparatus 100 shown in FIG. 1. In the figure, the image forming apparatus 100 includes a main CPU 101 corresponding to a control portion of the present invention. In addition, the main CPU 101 is connected to an image processing portion 102, a ROM 103, a RAM 104, an image memory 105, an NIC 106, an operation panel 400, a sub CPU 203, and a sub CPU 303. Note that, the document reading apparatus of the present invention is composed of the main CPU 101 and an integral display portion 401 included in the operation panel 400.

The main CPU 101 integrally controls each input/output device in accordance with a program previously written into the ROM 103, and temporarily stores data input/output during this control in a predetermined memory area of the RAM 104. The image memory 105 stores image data output from the image processing portion 102. A file and a password transmitted from a client PC 107 are stored in a HDD (not-shown).

The operation panel 400 includes the integral display portion 401 corresponding to a display portion of the present invention, and a key switch portion 402, such as a ten key and a start key. The integral display portion 401 is integrally provided with a display portion 401$a$, such as a liquid crystal display (LCD), and the area sensor portion 401$b$ capable of reading a small-sized document, mainly including a name card, an ID card such as a driver's license, and an L-sized picture. Note that, the area sensor portion 401$b$ detects reflected light by a finger of a user so that a coordinate position of the finger on a screen can be specified. Accordingly, the area sensor portion 401$b$ can be also used as an optical touch panel. Moreover, the display portion 401$a$ displays the condition of the image forming apparatus 100, compatible sheet size and copying magnification and the like.

The NIC (Network Interface Card) 106 is a communication means for performing communication with the client PC 107 through a communication line. The image forming apparatus 100 performs printing based on print data transferred from the client PC 107, or transfers image data obtained from the document reading portion 300 to the client PC 107 through the NIC 106.

The image forming portion 200 is controlled by the sub CPU 203, and includes a fixing unit 201, a driver 202, and an A/D converter 204. The fixing unit 201 corresponds to the fixing unit 7 shown in FIG. 1, and includes a fixing heater 201$a$ and a fixing temperature sensor 201$b$. The fixing temperature sensor 201$b$ detects a temperature of the heat roller 71 in the fixing unit 7 of FIG. 1 to output temperature data to the sub CPU 203.

The main CPU 101 transmits a predetermined warm-up command to the sub CPU as first return processing. When receiving the predetermined warm-up command from the main CPU 101, the sub CPU 203 applies electric current to the fixing heater 201$a$, and controls energizing of the fixing heater 201$a$ so that a surface temperature of the heating roller 71 heated by the fixing heater 201$a$ can be kept constant at a predetermined temperature, based on the temperature information obtained from the fixing temperature sensor 201$b$. When a temperature of the surface of the heat roller 71 reaches the predetermined temperature, the sub CPU 203 determines that it reaches the state where processing can be performed (ready state) and notifies the main CPU 101 of the fact.

The document reading portion 300 is controlled by the sub CPU 303, and includes a light source lamp unit 301, a driver 302 and an A/D converter 304. The light source lamp unit 301 corresponds to the exposure unit 1 shown in FIG. 1, and includes a light source lamp 301$a$, and a light quantity sensor 301$b$. The light quantity sensor 301$b$ detects light quantity of light irradiated from the light source lamp 301$a$ of the light source lamp unit 301 and inputs light quantity data to the sub CPU 303.

The main CPU 101 transmits a predetermined warm-up command to a sub CPU 303 as second recovery processing. When receiving the predetermined warm-up command from the main CPU 101, the sub CPU 303 applies electric current to the light source lamp 301$a$, and controls energizing of the light source lamp 301$a$ so that light quantity of the light source lamp 301$a$ can be kept constant at predetermined light quantity, based on light quantity information obtained from the light quantity sensor 301$b$. When the light quantity of the light source lamp 301$a$ reaches the predetermined light quantity, the sub CPU 303 determines that it reaches the state ready for processing (ready state) and notifies the main CPU 101 of the fact.

The driver 302 drives the light source lamp 301$a$ of the light source lamp unit 301 based on control data output from the sub CPU 303. The driver 202 drives the fixing heater 201$a$ built in the heat roller of the fixing unit 201 based on control data output from the sub CPU 203.

In addition to the above-mentioned devices, many input/output devices that are operated in image forming processing and document reading processing, including a motor, a clutch, a solenoid, and a sensor included in the image forming portion and the document reading portion, are connected to the sub CPU 203 and the sub CPU 303. In the image forming processing and the document reading processing, each of the sub CPU 203 and the sub CPU 303 reads the detected data by a sensor at a predetermined timing to drive a motor and the like depending on the detected data.

Further, the image forming apparatus 100 is connected to a coin vender 108 corresponding to a coin-type accounting apparatus of the present invention. The coin vender 108 collects a copy charge and the like from a user, for example, in a case where each monochrome copy costs 10 yen, 10 copies can be obtained by putting 100 yen into the coin vendor 108.

The primary characteristic of the present invention is to prevent a document from being left behind by performing reading of the document and reading of a wireless IC tag on the display screen of the operation panel, and to make it possible to use an electronic money function and the like using a wireless IC tag by automatically switching over a document reading mode to a wireless IC tag reading mode, or vice versa. In order to attain this, the document reading apparatus includes the integral display portion 401 which is integrally provided with the area sensor portion 401b and the wireless IC tag reader 401c, and the main CPU 101 for controlling screen display on the integral display portion 401, wherein the area sensor portion 401b detects reflection light from an object placed on the screen of the integral display portion 401, and the wireless IC tag reader 401c detects that a wireless IC tag comes close to the screen.

When detecting that a wireless IC tag comes close to the screen, the main CPU 101 changes a reading mode to a wireless IC tag reading mode to read information of the wireless IC tag by the wireless IC tag reader 401c. Note that, the main CPU 101 determines whether or not the object is a document based on an area of the reflection light from the object detected by the area sensor portion 401b, and when determining that the object is a document, may change a reading mode to a document reading mode to read the document placed on the screen by the area sensor portion 401b. Here, reading of the wireless IC tag may be performed when the wireless IC tag comes close to the IC tag reader in a state where the document reading mode is set by a user operation.

Figure 3A:
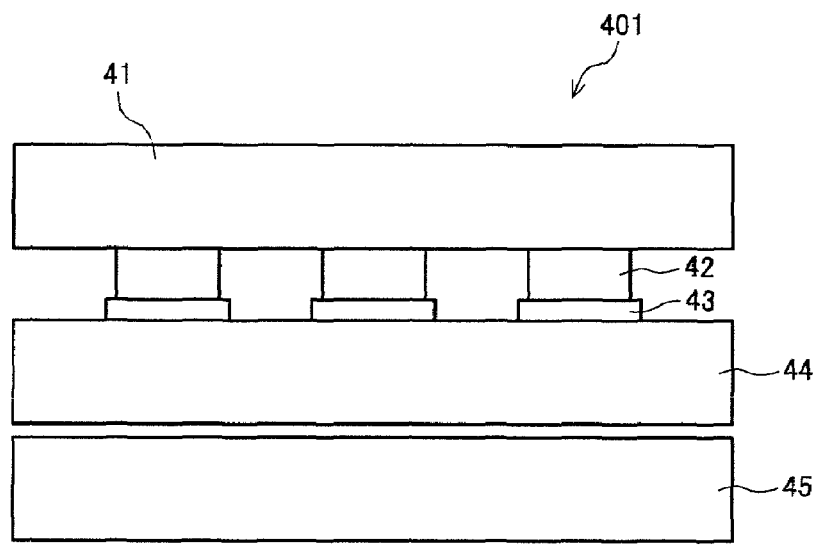
FIGS. 3A and 3B are views showing a structural example of an integral display portion according to the present invention and a wireless IC tag card.
Figure 3B:
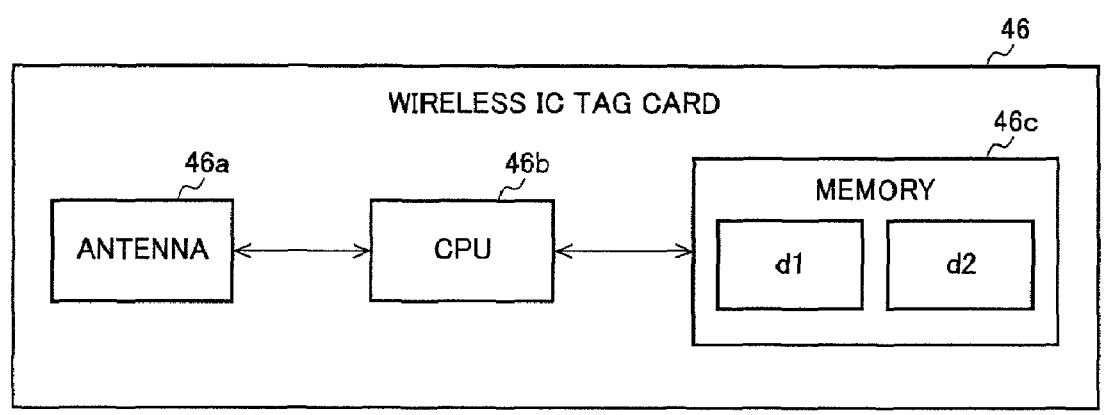

FIGS. 3A and 3B are views showing a structural example of the integral display portion according to the present invention and a wireless IC tag card. FIG. 3A shows an example of the structure of the integral display portion 401. In the figure, 41 denotes a liquid crystal layer, 42 denotes an optical sensor, 43 denotes a light shielding layer, 44 denotes a backlight light source, and 45 denotes an antenna of the wireless IC tag reader 401c. The area sensor portion 401b is made of a plurality of micro optical sensors 42 that are uniformly disposed on an XY plane, and is positioned in the middle between the liquid crystal layer 41 of the display portion 401a and the backlight light source 44. As the optical sensor 42, for example, a photodiode is used. Moreover, the optical sensor 42 is formed with the light shielding layer 43 so that no light from the backlight light source 44 enters. When an object touches a surface of the liquid crystal layer 41, the light from the backlight light source 44 is reflected by the object and received on the optical sensor 42, and thereby an image shape of the object is output as image data. In addition, the antenna 45 of the wireless IC tag reader 401c is provided in the lower surface of the backlight light source 44 to allow wireless communication with a wireless IC tag.

Note that, in FIG. 3A, the optical sensor 42 and the backlight light source 44 are disposed, for example, based on a well-known method (Japanese Laid-Open Patent Publication No. 2004-153327 and the like). Each of the optical sensors has a minute area and gaps with sufficient width are actually formed between the optical sensors. In addition, backlight light is irradiated and diffused through the gaps, thus the liquid crystal display is not affected even when the optical sensors 42 are arranged like in FIG. 3A.

FIG. 3B is a block diagram showing a structural example of a wireless IC tag card, where 46 denotes a wireless IC tag card. The wireless IC tag card 46 includes a card-side antenna 46a, a card-side CPU 46b, and a card-side memory 46c. The card-side antenna 46a performs communication with the antenna 45 of the wireless IC tag reader 401c in the side of the document reading apparatus using an electromagnetic wave. The card-side CPU 46b and the card-side memory 46c are operated using the electromagnetic wave received by the card-side antenna 46a as an electric power, and transmit the information stored in the card-side memory 46c to the document reading apparatus or store the information from the document reading apparatus in the card-side memory 46c. Further, the card-side memory 46c stores identification information d1 and type information d2. The identification information d1 is ID information which is individually given to a user possessing a wireless IC tag card 46, and the type information d2 shows a type of card. The type information d2 shows that, for example, the wireless IC tag card 46 is a card that has an electronic money function and that is used in a specific settlement system FIGS. 4A and 4B are views showing an overview of the document reading apparatus provided with the integral display portion 401 which is characteristic of the present invention. In the figure, the document reading apparatus has the operation panel 400 provided with the integral display portion 401. In the case of the example shown in FIG. 4A, since a document 47 has no wireless IC tag, when the small-sized document 47 such as a driver's license and a name card is set on the screen of the integral display portion 401, the document reading apparatus is switched to the document reading mode, and the document 47 is read by the area sensor portion 401b.

Moreover, in the case of the example shown in FIG. 4B, since the wireless IC tag card 46 has a wireless IC tag, when the wireless IC tag card 46 comes close to the screen of the integral display portion 401, the document reading apparatus is switched to the wireless IC tag reading mode, and information of a wireless IC tag in the wireless IC tag card 46 is read by the wireless IC tag reader 401c. Note that, a shape of the wireless IC tag is not limited to a card shape shown in the figure, but, for example, may be a portable terminal with an electronic money function provided with a wireless IC tag.

FIGS. 5A and 5B are views showing an example of the detailed structure of the operation panel 400. FIG. 5A is an overall schematic view of the operation panel 400. FIG. 5B shows an example of an initial screen of the integral display portion 401. In the figure, P denotes a document positioning index point.

In FIG. 5A, the operation panel 400 includes the integral display portion 401 and the key switch portion 402. A user uses the point P on the screen of the integral display portion 401 as a document positioning index point when setting the document 47 and presses a "start key" of the key switch portion 402 so that reading of the document can be started.

In FIG. 5B, the main CPU 101 sets, on the screen of the integral display portion 401, a reading area 411 for reading a document and an operation area for displaying a menu tab 410 of the document reading apparatus. This example shows a case where the reading area is previously displayed on the display screen. When a user desires to perform reading of the document 47 by the integral display portion 401, the document 47 is placed on the reading area 411 where a "small-sized document reading area" is displayed. Moreover, the menu tab 410 is displayed on the lower side of the reading area 411, and setting items of operation keys are displayed on the menu tab 410 in the state of allowing tab switching. In the tab of "detailed setting", setting for post processing, single side/duplex, collecting (N-up) and an image position is performed.

FIGS. 6A through 6C are views showing an example of a screen of the integral display portion 401 when the document 47 is read by the area sensor portion 401b. FIG. 6A shows an example of a screen right after a small-sized document is placed, FIG. 6B shows an example of a screen after the start key is pressed in the state of FIG. 6A and reading processing is executed, and FIG. 6C shows an example of a screen after an N in 1 key is pressed in the state of FIG. 6B. In the figures, 412 denotes a preview area, 413 denotes an external form of a sheet, 414 denotes a preview (thumbnail) image, 415 denotes an N in 1 key, and 416 denotes a reading completion key.

When a user places the document 47 on the reading area 411 shown in FIG. 5B, the area sensor portion 401b of the integral display portion 401 detects it, the screen display is shifted to the screen display shown in FIG. 6A.

In FIG. 6A, when the document reading apparatus detects that the document 47 is placed on the screen, the apparatus shifts to a "small-sized document reading mode". When it is shifted to this mode, the display portion 401a makes a display showing that the "small-sized document reading mode" is set, for example, a message of "press start button to read small-sized document". Note that, according to the mode switching, a right-side item in the menu tab 410 is changed from "detailed setting" to "image position".

In FIG. 6B, for example, the preview area 412 and the like are displayed on the operation area including the menu tab 410, and the external form of the sheet 413 (herein A4 size) and the thumbnail image 414 of the document 47 are displayed on the preview area 412. Note that, the thumbnail image 414 is displayed after reading of the document 47 is completed. The document reading processing is performed when the document 47 is set on the screen and the "start key" of the operation panel 400 is pressed.

In addition, as shown in FIG. 6A, when the user presses the "start key" of the key switch portion 402 provided in the operation panel 400 with the document 47 set on the screen, processing for reading the document 47 is started by the area sensor portion 401b. As shown in FIG. 6B, the thumbnail image 414 of the image data of the document 47 read by the area sensor portion 401b is displayed as a preview on the preview area 412. Note that, the external form of a sheet 413 is selected as A4 size, and the thumbnail image 414 is displayed at a center of a rectangle of the external form of a sheet.

Here, the N in 1 key 415 is an operation key for confirming whether or not switching to a collecting (N-up) mode for putting a plurality of documents in a single page together. When a user presses the N in 1 key 415, the document reading apparatus waits for placement of an additional document (including a back side of a document). When the user sets an additional document and presses the "start key", then the area sensor portion 401b reads the additional document and the display portion 401a displays it on the preview area 411 for a preview. This processing is repeated as many times as the number (N number) of additional documents. FIG. 6C shows the situation at this time. Here, the N in 1 key 415 is displayed in gray to show that it is in the N-up (N in 1) mode.

FIG. 7 is a view showing an example of a screen of the integral display portion 401 when the wireless IC tag card 46 is read by the wireless IC tag reader 401c. When a user puts the wireless IC tag card 46 close to the integral display portion 401 shown in FIG. 5B, the wireless IC tag reader 401c of the integral display portion 401 detects it, and the screen is shifted to the screen display shown in FIG. 7. That is, when the document reading apparatus detects that the wireless IC tag card 46 comes close to or is placed on the screen, it shifts to the "wireless IC tag reading mode". When it is shifted to this mode, the display portion 401a makes a display showing that the "wireless IC tag reading mode" is set, for example, when information of the wireless IC tag is electronic money information, a message of "Electronic money information is detected. Accounting processing is performed.".

In the above, when the wireless IC tag card 46 is placed on the screen of the integral display portion 401, the area sensor portion 401b of the integral display portion 401 detects it, but, further, since the wireless IC tag reader 401c of the integral display portion 401 detects the proximity of the wireless IC tag, the main CPU 101 prohibits a shift to the "small-sized document reading mode" and controls to shift to the "wireless IC tag reading mode". Note that, since the wireless IC tag reader 401c is capable of detecting the proximity of the wireless IC tag in a state where the wireless IC tag card 46 is put over the screen of the integral display portion 401, that is, in a state where the wireless IC tag card 46 is not placed on the screen and is separated from the screen by a predetermined distance, it may be shifted to the "wireless IC tag reading mode" when the proximity is detected. In this way, when an object comes close to or is placed on the screen of the integral display portion 401, it is switched to the "wireless IC tag reading mode" in a case where the wireless IC tag is detected, alternatively, when the object placed on the screen is of a card size and the proximity of the wireless IC tag is not detected, it is switched to the "small-sized document reading mode".

In addition, when information of the wireless IC tag is electronic money information, the document reading apparatus performs accounting processing based on the electronic money information read by the wireless IC tag reader 401c.

For example, when the document reading apparatus is connected to the image forming apparatus 100 to be constituted integrally, accounting processing of a fee (copy charge and the like) for the use of the image forming apparatus 100 can be performed using the electronic money information.

In addition, when the document reading apparatus is connected to the image forming apparatus 100 and the coin vender 108, accounting processing of a fee for the use of the image forming apparatus 100 can be performed using either the coin vender 108 or the electronic money information.

In the example above, when the wireless IC tag is provided like the wireless IC tag card 46, it is automatically switched to the "wireless IC tag reading mode", however, there is a case where it is desired to read and print an image printed on the card surface without using the wireless IC tag card 46 as a wireless IC tag. In order to correspond to such a case, a user may switch a reading mode to the "small-sized document reading mode" by manual setting.

Here, based on an area of the reflection light from the object detected by the area sensor portion 401b, the main CPU 101 determines whether the object is a document or a finger of the user, and when it is determined as a finger of the user, it is switched to a user operation mode for accepting a user operation by the area sensor portion 401b. This will be described referring to FIGS. 8A and 8B below.

Figure 8A:
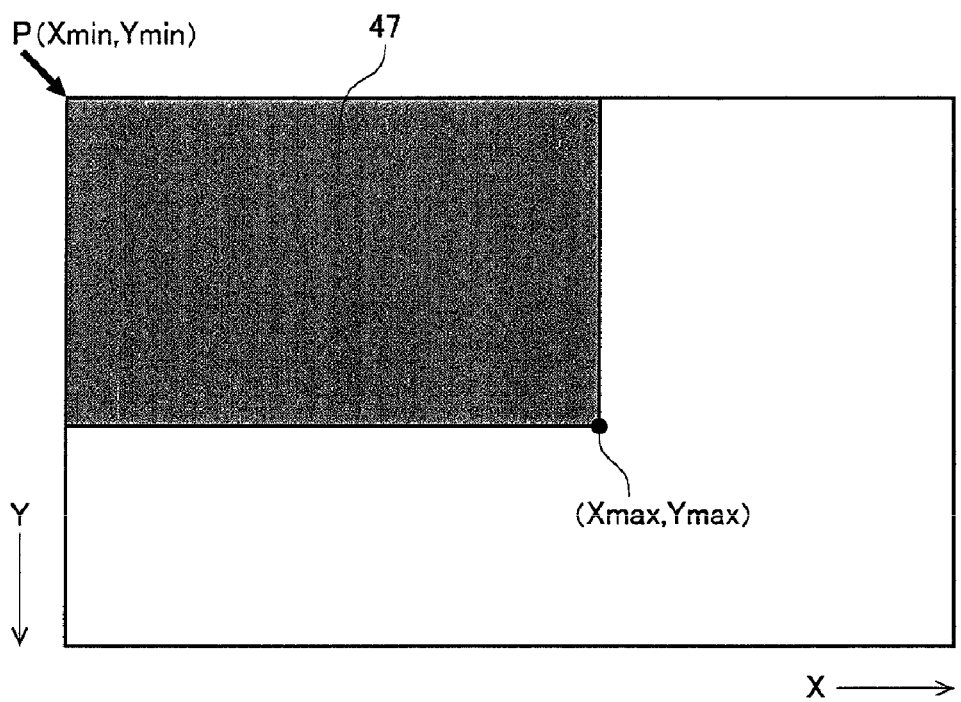
FIGS. 8A and 8B are views showing an example of an image reading state when a change in reflection light is detected in the area sensor portion of the integral display portion.
Figure 8B:
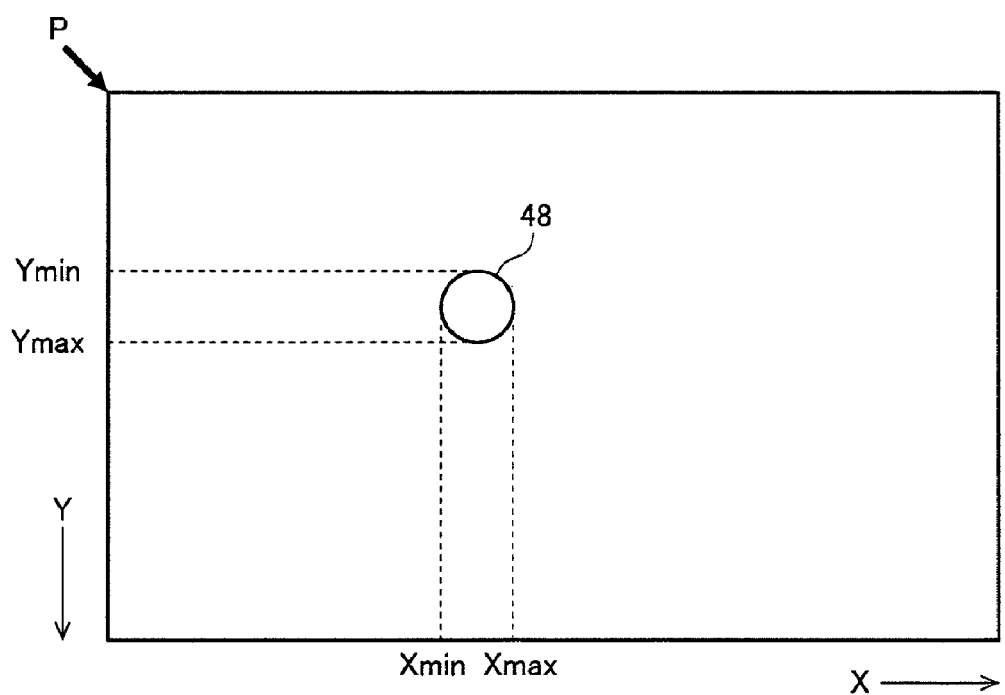

FIGS. 8A and 8B are views showing an example of the image reading state when reflection light is detected in the area sensor portion 401b of the integral display portion 401. For all light receiving elements that detected reflection light of the area sensor portion 401b, the main CPU 101 calculates maximum values (X max, Y max) and minimum values (X min, Y min) of X coordinates and Y coordinates of the light receiving elements. FIG. 8A shows a state where the document 47 is read. Moreover, FIG. 8B shows a state where a finger 48 of a user is touched and reflection light from the finger 48 is read.

When the difference between X coordinates (X max, X min) and the difference between Y coordinates (Y max, Y min) in the light receiving elements having detected reflection light are larger than predetermined values Xth and Yth, the document reading apparatus determines that the document 47 is placed on the area sensor portion 401b and shifts a document reading mode to the "small-sized document reading mode" to read the document 47 by the area sensor portion 401b of the integral display portion 401. On the other hand, when the difference between X coordinates (X max, X min) and the difference between Y coordinates (Y max, Y min) are smaller than the predetermined values Xth and Yth, it is determined that the finger 48 is placed and accept that as a normal operation input by a user and an reading operation is performed from the document platen/SPF.

Figure 10:
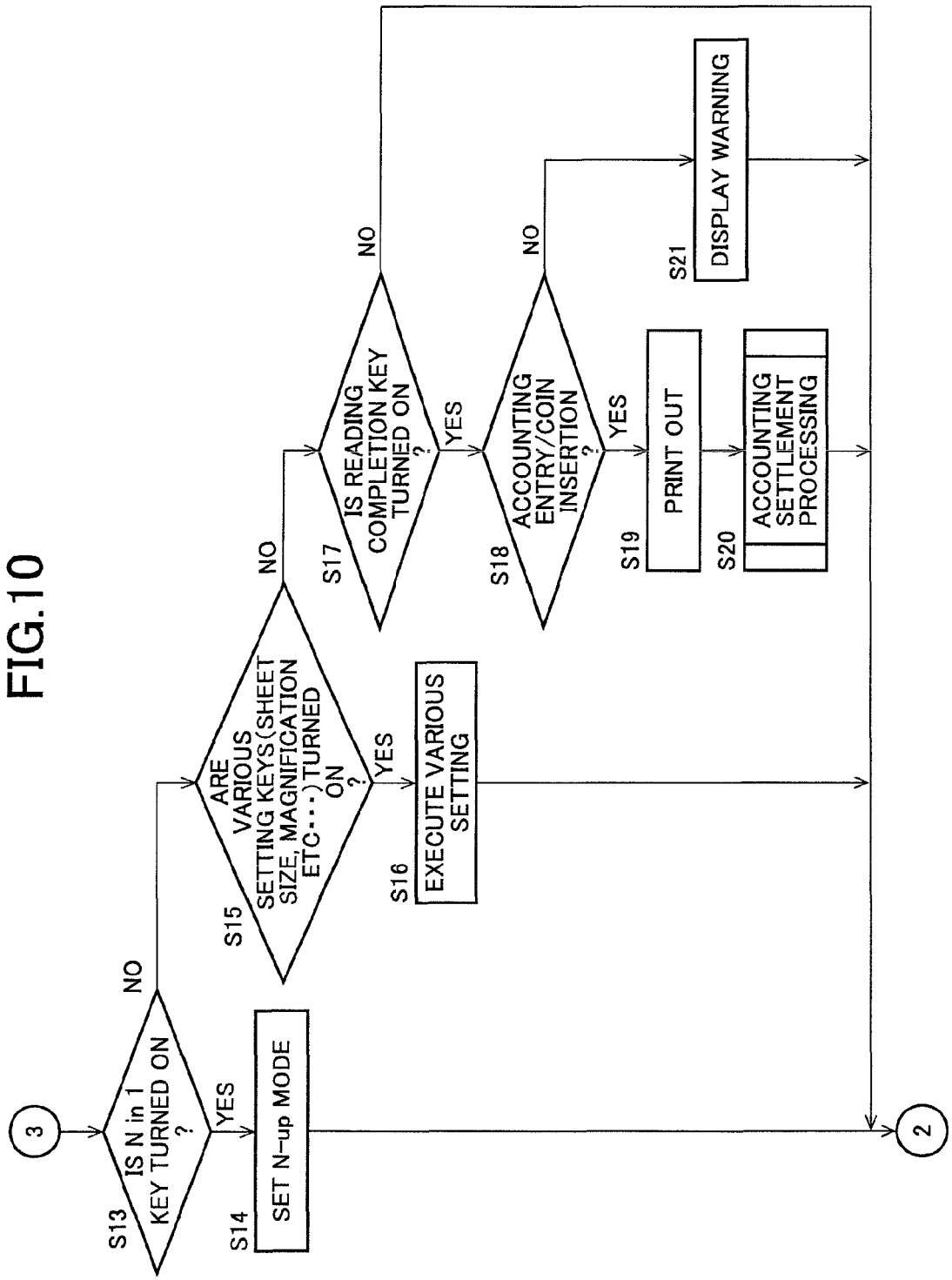
FIG. 10 is a flowchart, a continuation of that shown in FIG. 9, illustrating an example of processing by the main CPU included in the document reading apparatus of the present invention.
Figure 11:
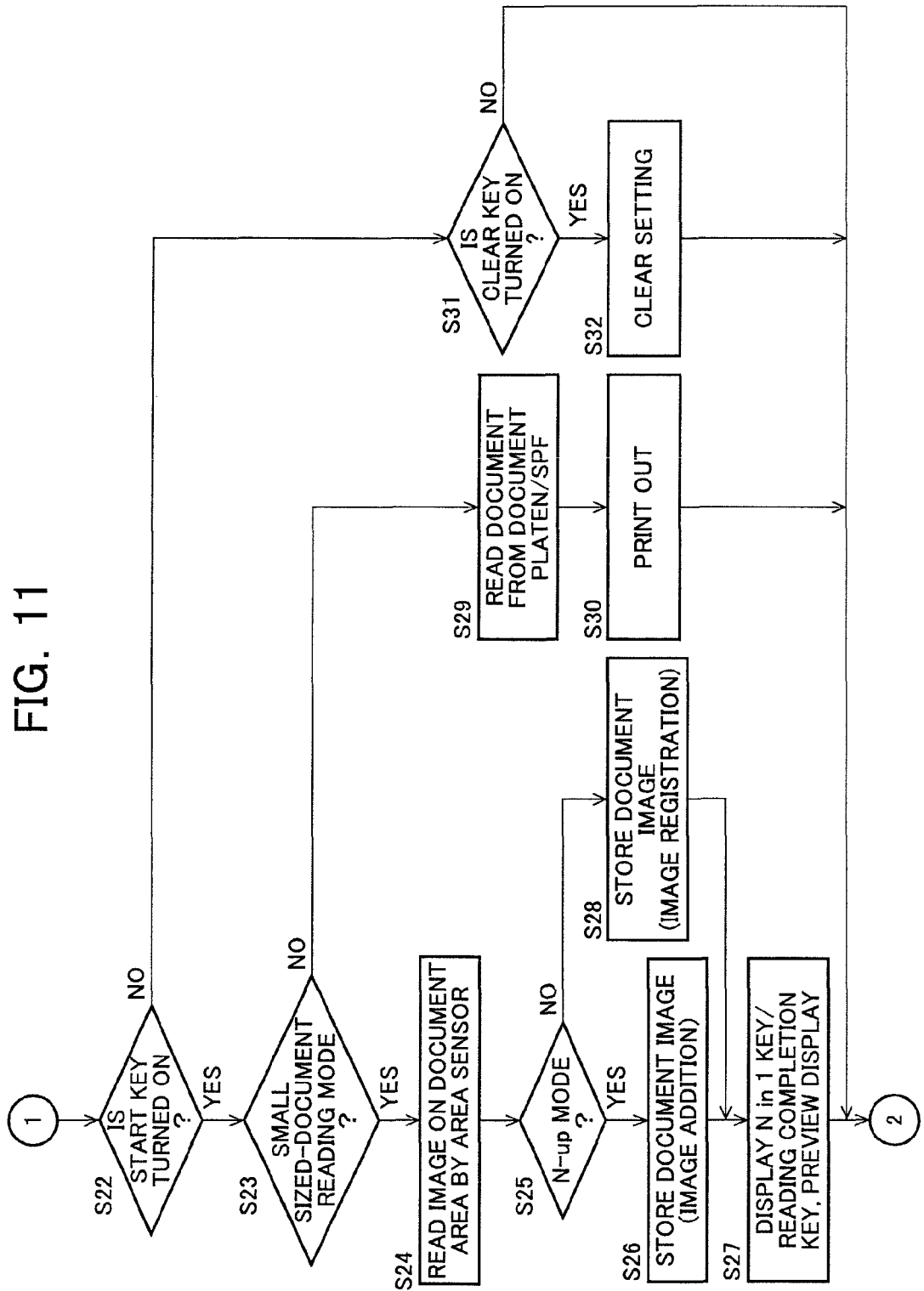
FIG. 11 is a flowchart, a continuation of that shown in FIG. 9, illustrating an example of processing by the main CPU included in the document reading apparatus of the present invention.

FIGS. 9 to 11 are flowcharts illustrating an example of processing by the main CPU 101 provided in the document reading apparatus of the present invention. FIGS. 10 and 11 are flowcharts following to that shown in FIG. 9. Note that, this example illustrates a case where a small-sized document or a wireless IC tag card is placed on the screen of the integral display portion 401, but not limited thereto.

In FIG. 9, first, the main CPU 101 determines the presence of key input to the key switch portion 402 (step S1). When key input is performed (in the case of YES at step S1), the procedure proceeds to step S22 in FIG. 11. Alternatively, when no key input is performed (in the case of NO at step S1), whether or not any of light receiving elements of the area sensor portion 401b detects any change in reflection light is determined (step S2). Here, when there is a change in output of the reflection light, it is determined that a document is placed or a touch operation is performed. When the change in the reflection light is detected (in the case of YES at step S2), whether or not a document is placed on the area sensor portion 401b is determined (step S3). Alternatively, when no change in the reflection light is detected (in the case of NO at step S2), the procedure returns to step S1 to repeat the processing.

When it is determined that a document is placed on the area sensor portion 401b (in the case of YES at step S4), the main CPU 101 determines whether or not proximity of a wireless IC tag is detected (step S5), and when the proximity of a wireless IC tag is detected (in the case of YES at step S5), sets the "wireless IC tag reading mode" and changes the display of the display screen to that shown in FIG. 7 and reads the information of the wireless IC tag (step S6). Alternatively, when it is determined that no document is placed on the area sensor portion 401b (in the case of NO at step S4), the procedure proceeds to step S13 in FIG. 10.

Alternatively, when the main CPU 101 does not detect the proximity of a wireless IC tag (in the case of NO at step S5), it sets the "small-sized document reading mode" and changes the display of the display screen to that shown in FIG. 6A (step S7) and sets a document reading area (step S8). Note that, an area inside a rectangle which has maximum values and minimum values of X coordinate and Y coordinate (X max, Y max, X min, and Y min) of light receiving elements which received reflection light as the opposite angles is set as the document reading area.

Subsequently, the main CPU 101 reads the wireless IC tag information at step S6 and determines whether or not electronic money information based on the type information d2 (step S9), and when it is not electronic money information (in the case of NO at step S9), the procedure proceeds to step S7. Note that, in this example, in the case of an IC card other than electronic money (for example, a travel card for the public transportation and the like), it is assumed that an image itself printed on a surface of the IC card is read, and "small-sized document reading mode" is set.

Alternatively, when the wireless IC tag information is electronic money information (in the case of YES at step S9), the main CPU 101 makes an access to a server providing electronic money service based on the identification information d1 and confirms whether or not a user is allowed to receive the service, or whether or not there is a balance at the bank to determine whether it is possible to charge the user (step S10). When it is determined that it is possible to charge the user (in the case of YES at step S10), setting of accounting processing using electronic money (accounting entry processing) is executed (step S11). When the accounting entry processing is executed, copying using electronic money is allowed. Alternatively, when it is determined that it is not possible to charge the user due to no balance at the bank and the like (in the case of NO at step S10), the integral display portion 401 performs error display for warning the fact (step S12). When the wireless IC tag is removed from the screen of the integral display portion 401, the processing is stopped and the screen display is returned to an initial screen.

In FIG. 10, when it is determined that no document is placed on the area sensor portion 401b (in the case of NO at step S4), the main CPU 101 determines as a touch operation and determines whether or not a center position between maximum values and minimum values of X coordinate and Y coordinate (X max, Y max, X min, and Y min) is included in a display area of the N in 1 key (step S13). Here, when the center position between maximum values and minimum values of X coordinate and Y coordinate is included in the display area of the N in 1 key (in the case of YES at step S13), the main CPU 101 sets the N-up (N in 1) mode (step S14).

Alternatively, when the center position between maximum values and minimum values of X coordinate and Y coordinate is not included in the display area of the N in 1 key (in the case of NO at step S13), it is determined whether or not the center position between maximum values and minimum values of X coordinate and Y coordinate (X max, Y max, X min, and Y min) is included in display areas of various setting keys (sheet size, magnification, and the like) (step S15). Here, when the center position between maximum values and minimum values of X coordinate and Y coordinate is included in the display areas of various setting keys (in the case of YES at step S15), various settings are performed (step S16).

Alternatively, when the center position between maximum values and minimum values of X coordinate and Y coordinate is not included in the display areas of various setting keys (in the case of NO at step S15), it is determined whether or not the center position between maximum values and minimum values of X coordinate and Y coordinate (X max, Y max, X min, and Y min) is included in a display area of the reading completion key (step S17). Here, when the center position between maximum values and minimum values of X coordinate and Y coordinate is included in the display area of the reading completion key (in the case of YES at step S17), it is determined whether or not accounting entry processing has been performed using electronic money of the wireless IC tag card 46, or whether or not the amount of coin exceeds the price required for a copy is deposited in the coin vender 108 (step S18). Alternatively, when the center position between maximum values and minimum values of X coordinate and Y coordinate is not included in the display area of the reading completion key (in the case of NO at step S17), the procedure returns to step S1 to repeat the processing.

Subsequently, when it is determined that accounting entry processing or coin insertion is performed (in the case of YES at step S18), the main CPU 101 prints out an original image read by the area sensor portion 401b (step S19), and performs accounting settlement processing after printing out the image to complete the payment (step S20). Alternatively, when it is determined that accounting entry processing or coin insertion is not performed (in the case of NO at step S18), the integral display portion 401 makes a display for warning the fact (step S21).

Note that, copying processing in the "small-sized document reading mode" is started when the reading completion key is turned ON, and when the start key is turned ON in the "small-sized document reading mode", document reading and preview display are performed.

In FIG. 11, in the case of YES at step S1 shown in FIG. 9 (when there is key input), the main CPU 101 determines whether or not the start key is turned ON (step S22). When it is determined that the start key is turned ON (in the case of YES at step S22), whether or not a document reading mode is the "small-sized document reading mode" is determined (step S23). When it is determined that the document reading mode is the "small-sized document reading mode" (in the case of YES at step S23), a display of the screen corresponding to the document reading area set at step S8 (shown in FIG. 9) is made in a uniform single color, irradiation light irradiated on the document is uniformed, and the document on the document reading area set at step S8 (shown in FIG. 9) is read by the area sensor portion 401b and the read original image is stored (step S24). Note that, the display in the uniform single color needs to be in white in the case of color reading, but is not necessarily in white in the case of monochrome reading.

Subsequently, the main CPU 101 determines whether or not the N-up (N in 1) mode is set (step S25), and when the N-up (N in 1) mode is set (in the case of YES at step S25), the original image read by the area sensor portion 401b is stored as an additional page to previously stored original images (step S26). Then, display of the N in 1 key and the reading completion key is made and the output state (preview) when printed based on the read image data and the setting mode is displayed at the same time, as shown in FIG. 6B (step S27). For example, in the case of the N-up (N in 1) mode, the total number of read document images is set as N number (document pages) in N-up (N in 1), and all original images are composed on one sheet, and a composed image is displayed as a preview image.

Alternatively, when the N-up (N in 1) mode is not set (in the case of NO at step S25), the original image read by the area sensor portion 401b is stored (step S28) and the procedure shifts to step S27. Note that, in this case, it is not in the N-up (N in 1) mode, and therefore when there is a original image stored already, the stored original image is cleared. Then, the procedure returns to step S1 in FIG. 9 to repeat the processing.

In addition, the main CPU 101, in a case where it determines that it is not the "small-sized document reading mode" (in the case of NO at step S23) and when it is detected by a document sensor (not shown) that a document is placed on the automatic document feeder (SPF) 120 at step S29, performs conveyance and reading of the document using the automatic document feeder 120, alternatively, when that is not detected by the document sensor, performs reading of the document on the document platen 92 (step S29). Then, the read document image is printed out (step S30), and the procedure returns to step S1 to repeat the processing.

In addition, when it is determined that the start key is not turned ON (in the case of NO at step S22), the main CPU 101 determines whether or not the clear key is turned ON (step S31), and when it is determined that the clear key is turned ON (in the case of YES at step S31), it clears the setting (step S32). Alternatively, when it is determined that the clear key is not turned ON (in the case of NO at step S31), the procedure returns to step S1 in FIG. 9 to repeat the processing.

Note that, in the flowchart above, although the processing is performed so that confirmation input for confirming whether to set the N-up (N in 1) is accepted, since front and back sides of a driver's license and the like are often composed into a sheet, in a case where the N-up (N in 1) mode is frequently used, the N-up (N in 1) mode may be previously set in the case of the small-sized document reading mode.

Figure 12:
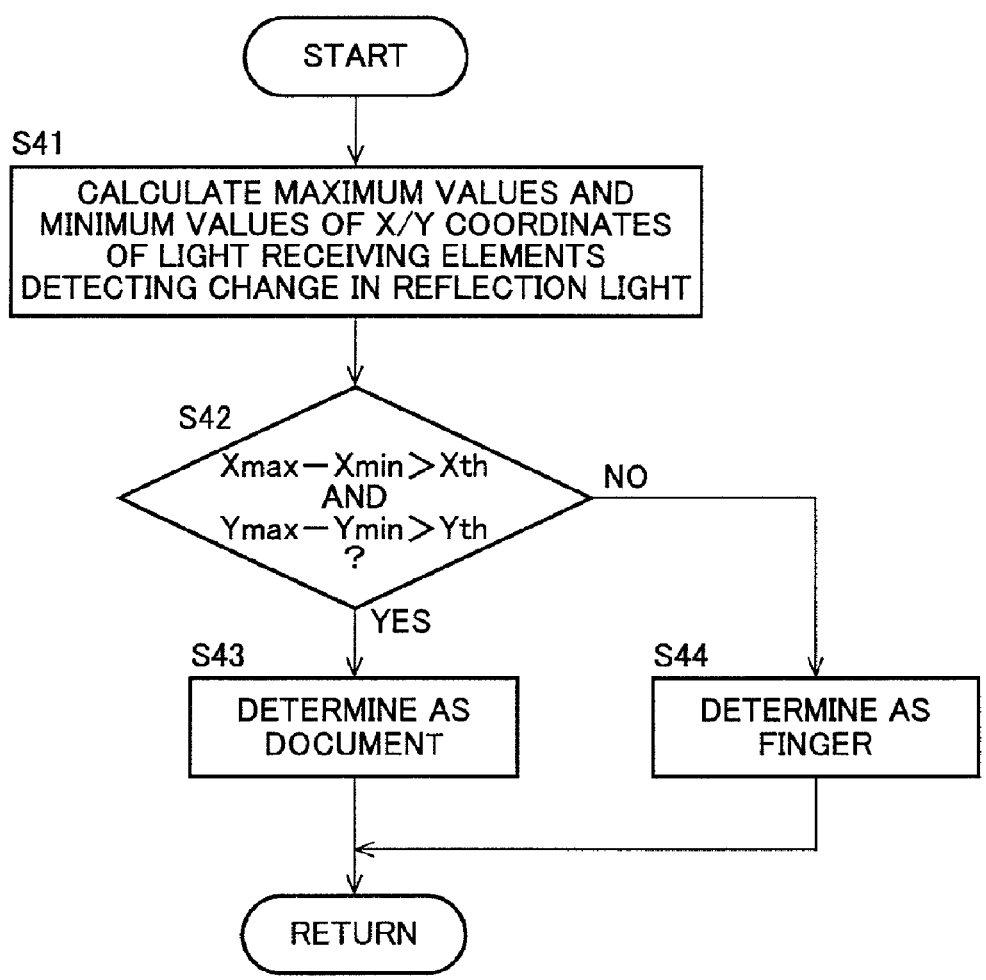
FIG. 12 is a flowchart illustrating an example of document determination processing at step S3 shown in FIG. 9.

FIG. 12 is a flowchart illustrating an example of document determination processing at step S3 shown in FIG. 9. In this example, description will be given for processing for performing determination of whether a document or a finger when a change in reflection light is detected by the area sensor portion 401b.

For all light receiving elements in which a change in reflection light is detected, the main CPU 101 calculates maximum values (X max, Y max) and minimum values (X min, Y min) of X coordinates and Y coordinates of the light receiving elements (step S41). When both of the difference between X coordinates (X max, X min) and the difference between Y coordinates (Y max, Y min) are larger than the threshold values Xth and Yth (in the case of YES at step S42), it is determined that a document is placed on the area sensor portion 401b (step S43), and otherwise (in the case of NO at step S42), it is determined that a finger of a user is placed (step S44). Note that, the threshold values Xth and Yth are set to substantially intermediate value between a minimum size considered as a document and a maximum size considered as an area of a finger tip, for example, to Xth and Yth=30 mm.

Figure 13:
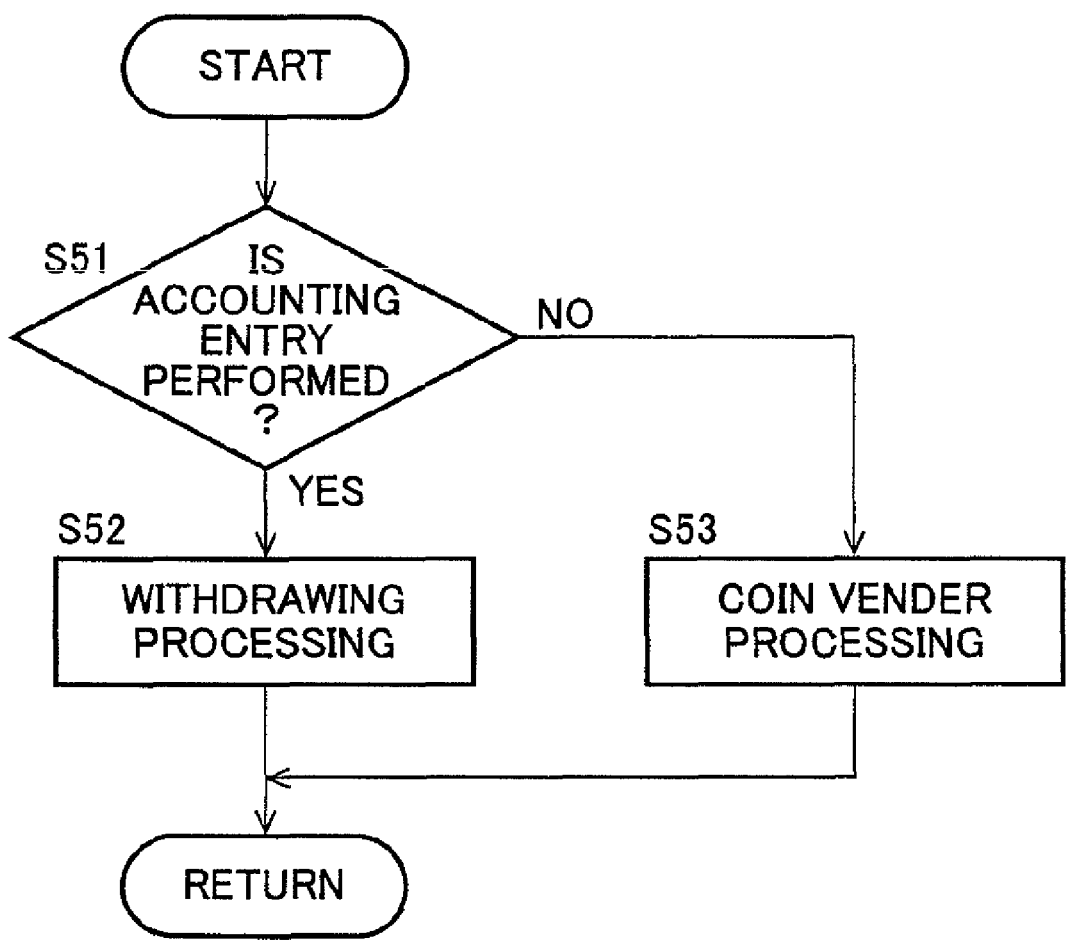
FIG. 13 is a flowchart illustrating an example of accounting settlement processing at step S20 shown in FIG. 10.

FIG. 13 is a flowchart illustrating an example of accounting settlement processing at step S20 shown in FIG. 10.

The main CPU 101 determines whether or not accounting entry processing using electronic money is performed by the wireless IC tag (step S51), and when the accounting entry processing is performed (in the case of YES), processing of withdrawing from the electronic money is performed based on the identification information d1 acquired from the wireless IC tag (step S52). Alternatively when no accounting entry processing is performed at step S51 (in the case of NO), accounting processing is performed by the coin vender 108 (step S53).

Figure 14:
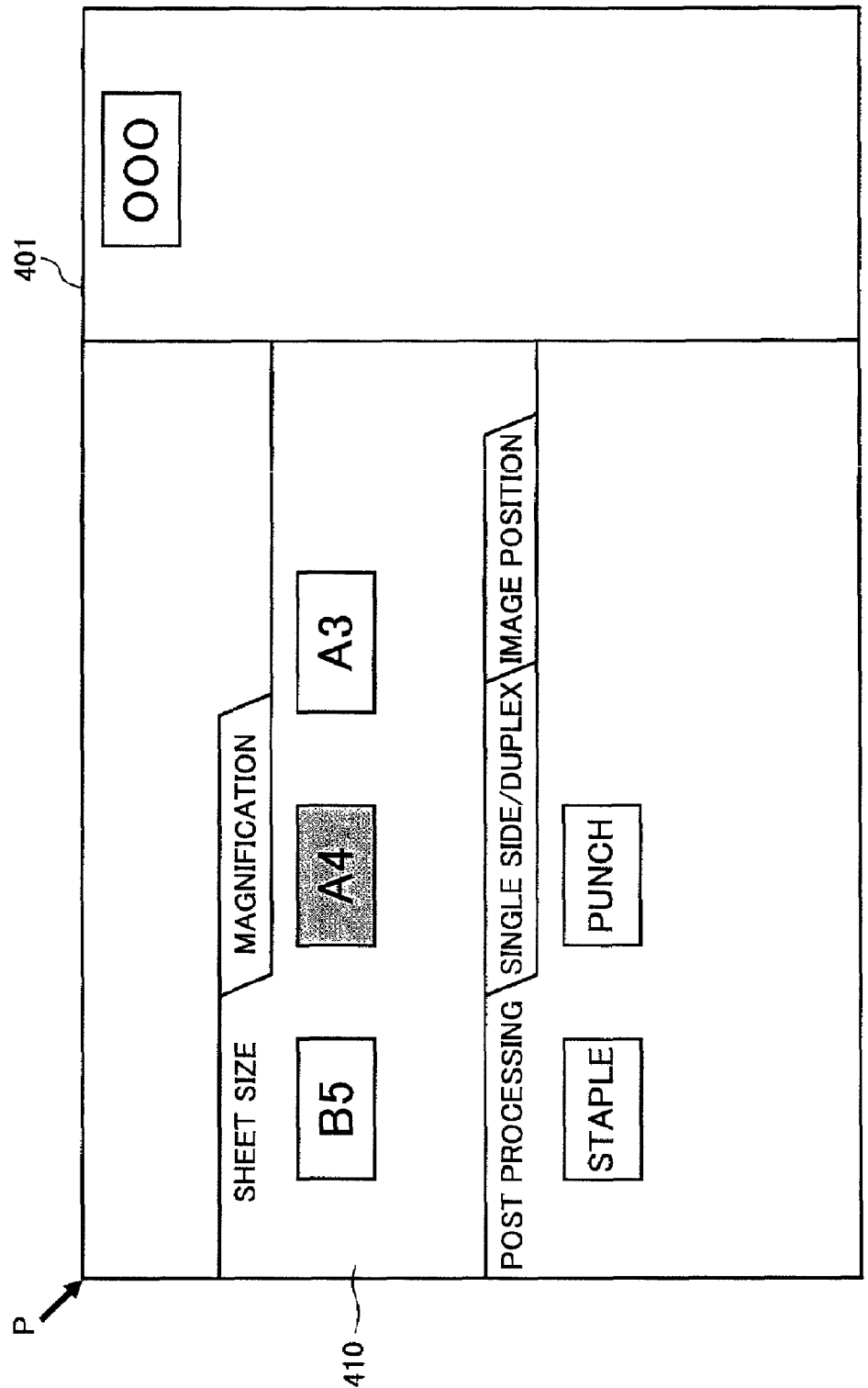
FIG. 14 is a view showing an example of an initial screen when a menu tab including various operation keys is displayed without previously providing a reading area.

FIG. 14 is a view showing an example of an initial screen when the menu tab 410 including various operation keys is displayed without previously providing a reading area.

In FIG. 14, the document reading apparatus displays, as an initial screen, only the menu tab 410 including various operation keys without providing the "small-sized document reading area" that is a reading area shown in FIG. 5B above. The menu tab 410 displays various operation keys of the document reading apparatus for each menu tab such that tabs including, for example, a sheet size, a magnification, post processing, single side/duplex, image position, are displayed so as to be switchable. Note that, in this example, since "A4" is selected as the sheet size, the document 47 is printed on a A4-sized sheet.

By making a display as described in this example, the display area of the menu tab 410 is not allocated to the "small-sized document reading area" which is the reading area of a document, and it is possible to display more menus on the screen.

When it is detected by the area sensor portion 401b of the integral display portion 401 that the document 47 is placed, a display is shifted to the screen display shown in FIG. 6A above. In this way, when the document 47 is placed on the screen, the document reading apparatus detects an area where the document 47 is placed and displays an area other than the area having the document 47 placed thereon as an operation area of the document reading apparatus.

Figure 15:
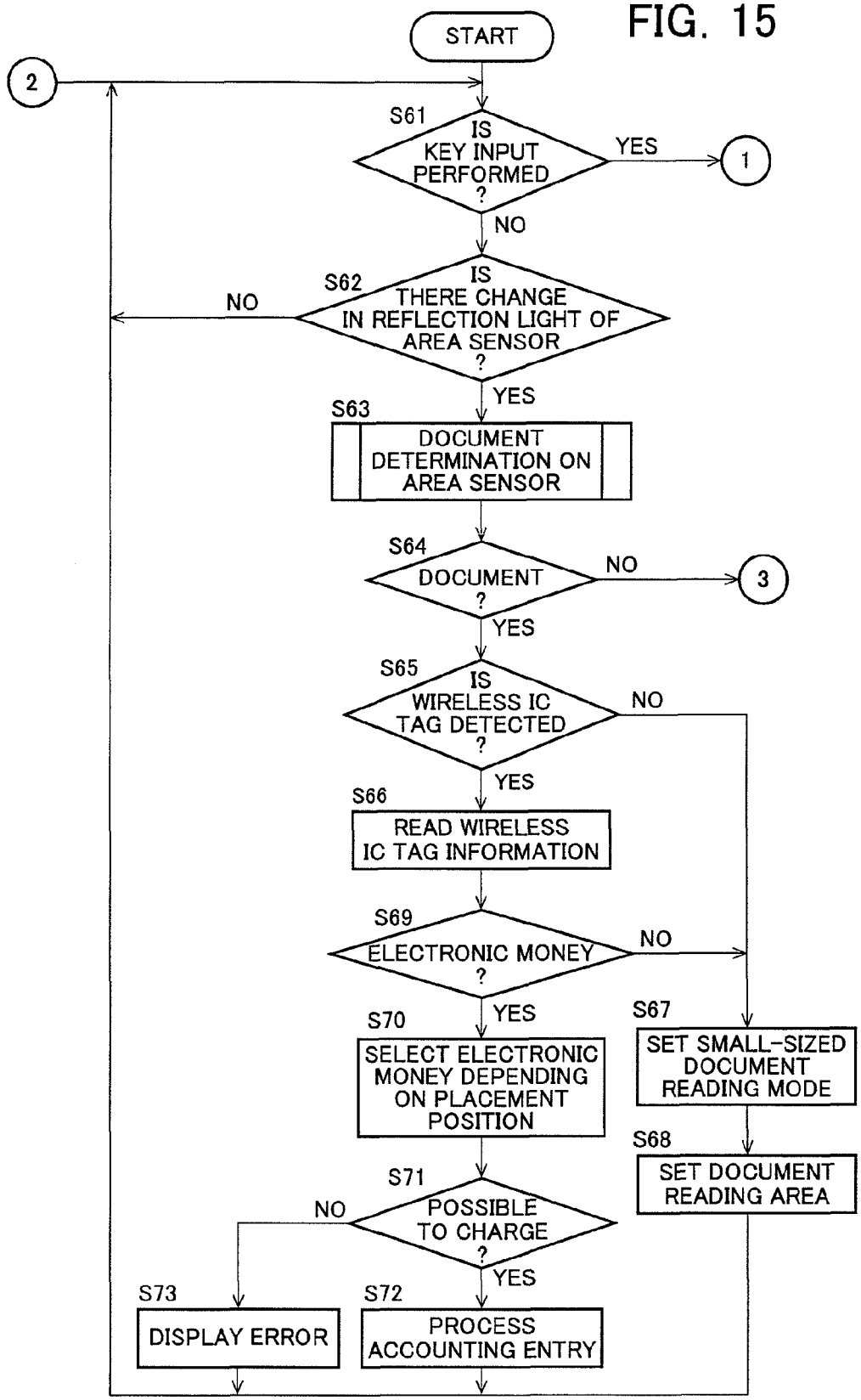
FIG. 15 is a flowchart illustrating another example of processing by the main CPU included in the document reading apparatus of the present invention.

FIG. 15 is a flowchart illustrating another example of processing by the main CPU 101 included in the document reading apparatus of the present invention. FIG. 15 shows the partly changed flowchart of FIG. 9. In this example, processing of step S70 is added to the flowchart of FIG. 9. Each processing of steps S61 to S69 in this example is the same as that of steps S1 to S9 of FIG. 9, respectively and each processing of steps S71 to S73 is the same as that of steps S10 to S12 of FIG. 9, respectively. Therefore, description will be given only for processing of step S70.

At step S70, when a wireless IC tag has a plurality of electronic money information, the main CPU 101 can select any of the plurality of electronic money information depending on a position where the wireless IC tag is placed on the screen of the integral display portion 401. That is, when a plurality of electronic money information is installed in a wireless IC tag so as to be available and there exist a plurality of electronic money available in the image forming apparatus, a user can easily select the electronic money that the user wants to use only by seeing icon display (icons for selecting electronic money 417a and 417b) shown in FIG. 16 and placing the wireless IC tag on the corresponding electronic money icon area.

Figure 16:
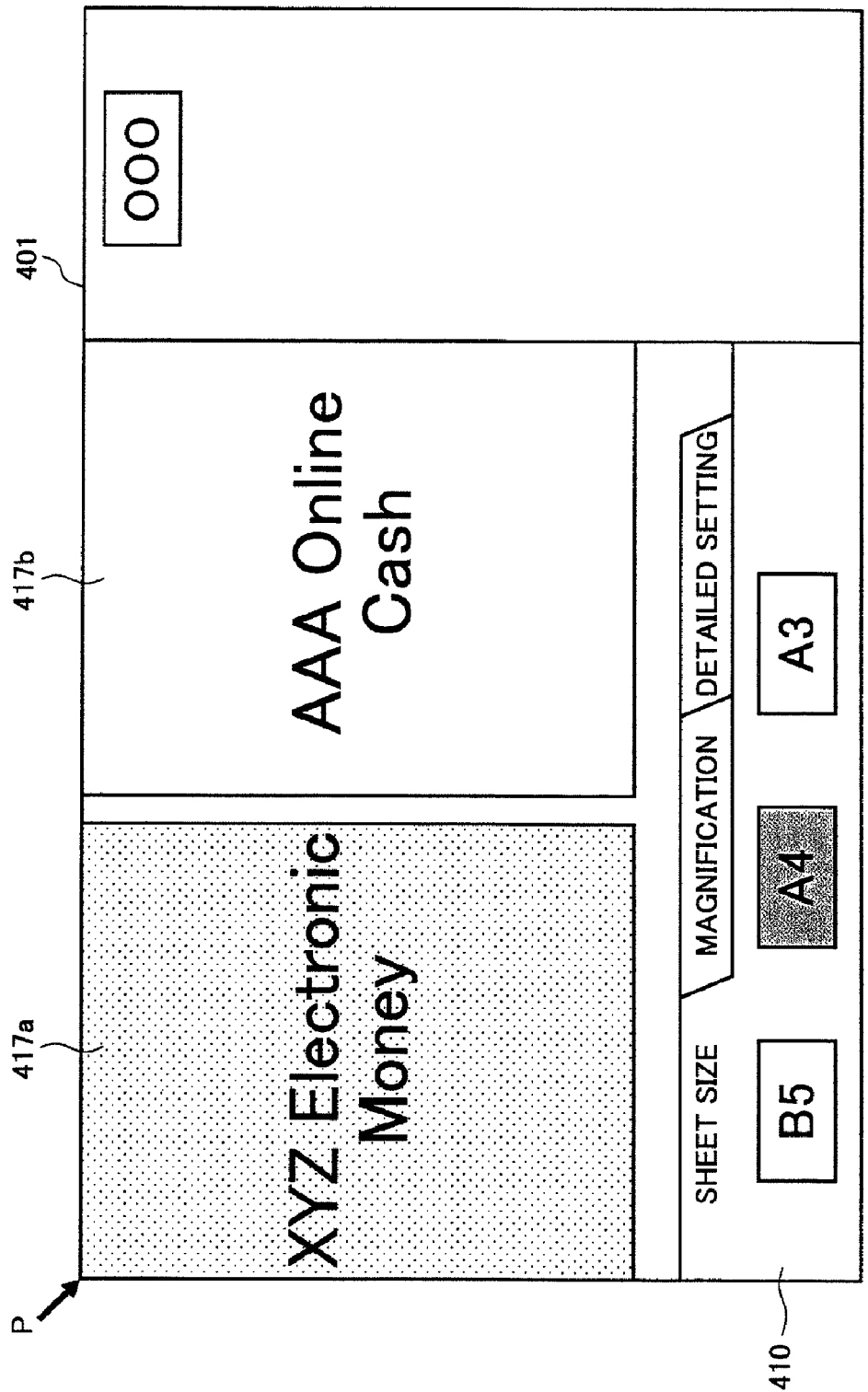
FIG. 16 is a view showing an example of an initial screen of the integral display portion when reading a wireless IC tag card having a plurality of electronic money information.

FIG. 16 is a view showing an example of an initial screen of the integral display portion 401 when reading a wireless IC tag card having a plurality of electronic money information. In the example of FIG. 16, when a user places a wireless IC tag card on the icon for selecting electronic money 417a, the electronic money of "XYZ Electronic Money" is made available, and when the wireless IC tag card is placed on the icon for selecting electronic money 417b, the electronic money of "AAA Online Cash" is made available. In this way, when the wireless IC tag card placed on the icons for selecting electronic money 417a and 417b displayed on the initial screen is selected as electronic money for settlement, it is possible to easily select a plurality of electronic money available in the image forming apparatus. Note that, the icon on which the wireless IC tag card is placed can be detected by position center of reflection light and a position of an icon display.

According to the present invention, the following effects can be obtained.

According to the present invention, since a document can be read on the display screen of the operation panel using the area sensor, it is not necessary to set the document on the document platen, and therefore, it is possible to prevent the document from being left behind, further, since it is possible to detect that a wireless IC tag comes close to the display screen by the wireless IC tag reader, an electronic money function by the wireless IC tag and the like can be easily used by automatically switching from the document reading mode to the wireless IC tag reading mode, or vice versa.

Furthermore, a user can perform operation inputting, document reading, and wireless IC tag reading from the liquid crystal display portion of an MFP, and it possible for the user to execute a plurality of different functions only using the liquid crystal display portion, and therefore, the operability can be improved.

The invention claimed is:
1. A document reading apparatus, comprising:
a display portion integrally including an area sensor and a wireless IC tag reader, said display portion having a screen on which images are displayed,
said area sensor being located in the vicinity of said screen such that the area sensor detects light reflected from an object placed on said screen, and
said wireless IC tag reader detects a wireless IC tag that is within a predetermined distance over said screen; and
a control portion for receiving a detection by the area sensor of reflected light from an object placed on said screen of the display portion and receiving a detection by the wireless IC tag reader that a wireless IC tag is within the predetermined distance over the screen, wherein
when the area sensor detects that the wireless IC tag is being placed on the screen and the wireless IC tag reader detects that the wireless IC tag is within the predetermined distance over the screen, the control portion switches to a wireless IC tag reading mode for reading information of the wireless IC tag by the wireless IC tag reader.

2. The document reading apparatus as defined in claim 1, wherein
when it is determined that the object is a document based on an area of reflection light from the object, the control portion is capable of switching to a document reading mode for reading the document placed on the screen by the area sensor, and
when it is determined that the object is a document and it is detected that the wireless IC tag comes close to the screen, the control portion prohibits switching to the document reading mode and switches to the wireless IC tag reading mode.

3. The document reading apparatus as defined in claim 1, wherein
when information of the wireless IC tag is electronic money information, accounting processing is performed based on the electronic money information read by the wireless IC tag reader.

4. The document reading apparatus as defined in claim 3, wherein
the document reading apparatus is connected to an image forming apparatus and performs accounting processing of a fee for usage of the image forming apparatus by the electronic money information.

5. The document reading apparatus as defined in claim 3, wherein
the document reading apparatus is connected to an image forming apparatus and a coin-type accounting apparatus and performs accounting processing of a fee for usage of the image forming apparatus by either the coin-type accounting apparatus or the electronic money information.

6. The document reading apparatus as defined in claim 3, wherein
when the wireless IC tag has a plurality of electronic money information, the control portion selects any of the plurality of electronic money information depending on a position where the wireless IC tag is placed on the screen.

7. The document reading apparatus as defined in claim 1, wherein the control portion determines whether or not the object is a finger of a user based on an area of reflection light from the object, and when it is determined as a finger of a user, switching to a user operation mode for receiving a user operation by the area sensor.

8. The document reading apparatus as defined in claim 1, wherein the control portion sets, on the screen of the display portion, a reading area for reading a document and an operation area for displaying an operation key of the document reading apparatus.

9. The document reading apparatus as defined in claim 1, wherein the display portion has an operation area for displaying an operation key of the document reading apparatus on the screen, and when the object is determined as a document, the control portion sets an area except for an area where the document is placed as the operation area.

10. The document reading apparatus as defined in claim 8, wherein the control portion displays, on the operation area of the document reading apparatus, an operation key for confirming whether to switch to a N-up mode for putting a plurality of documents into a single page together.

11. The document reading apparatus as defined in claim 8, wherein the control portion displays a preview image of the document on the operation area of the document reading apparatus.

12. An image forming apparatus comprising the document reading apparatus as defined in any one of claims 1 through 11.

* * * * *